United States Patent
Yoneya et al.

(10) Patent No.: US 6,518,535 B2
(45) Date of Patent: Feb. 11, 2003

(54) DEVICE AND METHOD FOR SEAMING WELDING

(75) Inventors: Masataka Yoneya, Akishima (JP); Masayuki Inoue, Akishima (JP); Shunji Yamaguchi, Akishima (JP); Yoshihiro Yamashita, Akishima (JP)

(73) Assignee: Kikuchi Co., Ltd., Tokyo (JP)

(*) Notice: Subject to any disclaimer, the term of this patent is extended or adjusted under 35 U.S.C. 154(b) by 0 days.

(21) Appl. No.: 09/914,339

(22) PCT Filed: Feb. 14, 2001

(86) PCT No.: PCT/JP01/01011
§ 371 (c)(1),
(2), (4) Date: Aug. 23, 2001

(87) PCT Pub. No.: WO01/64384
PCT Pub. Date: Sep. 7, 2001

(65) Prior Publication Data
US 2003/0010757 A1 Jan. 16, 2003

(30) Foreign Application Priority Data
Feb. 28, 2000 (JP) ......................................... 2000-052330

(51) Int. Cl.$^7$ .......................... B23K 11/06; B23K 31/02; B23K 37/04
(52) U.S. Cl. ............................ 219/82; 219/83; 228/5.7; 228/44.3; 228/49.4; 228/213
(58) Field of Search ........................... 228/103, 141.1, 228/164, 173.1, 212, 213, 5.7, 9, 44.3, 49.1, 49.4; 219/79, 81, 82, 83, 84, 86.23, 86.24, 86.25, 86.41

(56) References Cited

U.S. PATENT DOCUMENTS 4,879,445 A * 11/1989 Kawano et al. ............... 219/64
5,023,427 A * 6/1991 Neilheisel et al. ..... 219/121.31

(List continued on next page.)

FOREIGN PATENT DOCUMENTS

| DE | 4008009 C1 | * | 8/1991 |
| EP | 0522811 A1 | * | 1/1993 |
| JP | 5-154662 | | 6/1993 |
| JP | 8-197258 | | 8/1996 |
| JP | 410024376 A | * | 1/1998 |
| JP | 410296451 A | * | 11/1998 |
| JP | 11-170090 | | 6/1999 |
| JP | 2000-141048 | | 5/2000 |
| JP | 02000218376 A | * | 8/2000 |
| JP | 2000-334571 | | 12/2000 |
| JP | 2001239371 A1 | * | 9/2001 |

OTHER PUBLICATIONS

US 2001/0017291 A1 Bishop Aug. 30, 2001.*
translation of JP–410024376A.*
translation of JP–11170090 A.*

*Primary Examiner*—Tom Dunn
*Assistant Examiner*—Kiley Stoner
(74) *Attorney, Agent, or Firm*—Flynn, Theil, Boutell & Tanis, P.C.

(57) ABSTRACT

This invention relates to an apparatus and a method for manufacturing a member which makes a part of a car body of an automobile or the like by mash-seam welding a plurality of blanks. Standby areas (B) are provided at both right and left sides of an welding area (A) to/from which a seam welding machine (130) moves forward/backward, and a lapping device (100) for overlapping respective end portions of blanks (W1)(W2) and a temporary clamping device (80) for temporarily clamping the blanks (W1)(W2) are disposed on two transfer tables (70) which are sent from the standby areas (B) to the welding area (A) by turns. When the blanks (W1)(W2) with these end portions overlapped one another and temporarily clamped are sent to the welding area (A) by the transfer table (70), the blanks (W1)(W2) are permanently clamped by a permanent clamping device (180) and thereafter, subjected to a mash-seam welding by upper/lower electrode rollers (142)(148) of the seam welding machine 130. At this time, upward reactive force which acts on a cylinder (146) for pressing the upper roller (148) downwardly is received by a frame structure (134) which is installed in the welding area (A).

22 Claims, 22 Drawing Sheets

U.S. PATENT DOCUMENTS

| | | | | |
|---|---|---|---|---|
| 5,042,125 A | * | 8/1991 | Harwood et al. | 228/49.1 |
| 5,081,331 A | * | 1/1992 | Beyer et al. | 219/64 |
| 5,105,516 A | * | 4/1992 | Enomoto et al. | 228/6.1 |
| 5,249,725 A | * | 10/1993 | Nakatsu | 219/64 |
| 5,605,275 A | * | 2/1997 | Rintala | 228/49.4 |
| 5,726,410 A | * | 3/1998 | Fukushima et al. | 219/117.1 |
| 5,767,490 A | * | 6/1998 | Peter | 219/603 |
| 5,789,718 A | * | 8/1998 | Fukushima et al. | 219/117.1 |
| RE36,612 E | * | 3/2000 | Fukushima et al. | 219/83 |

* cited by examiner

F I G. 1
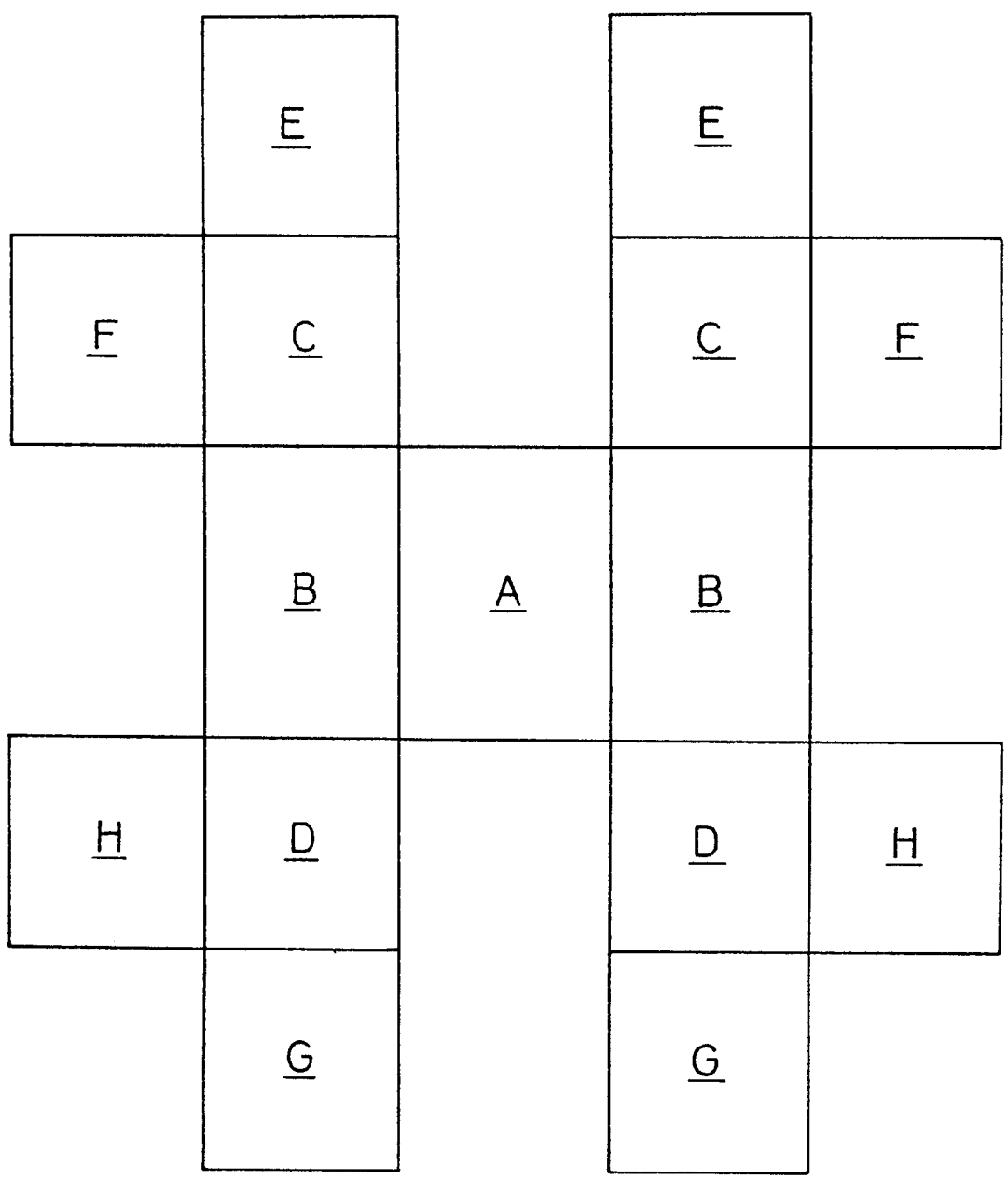

F I G. 1 5
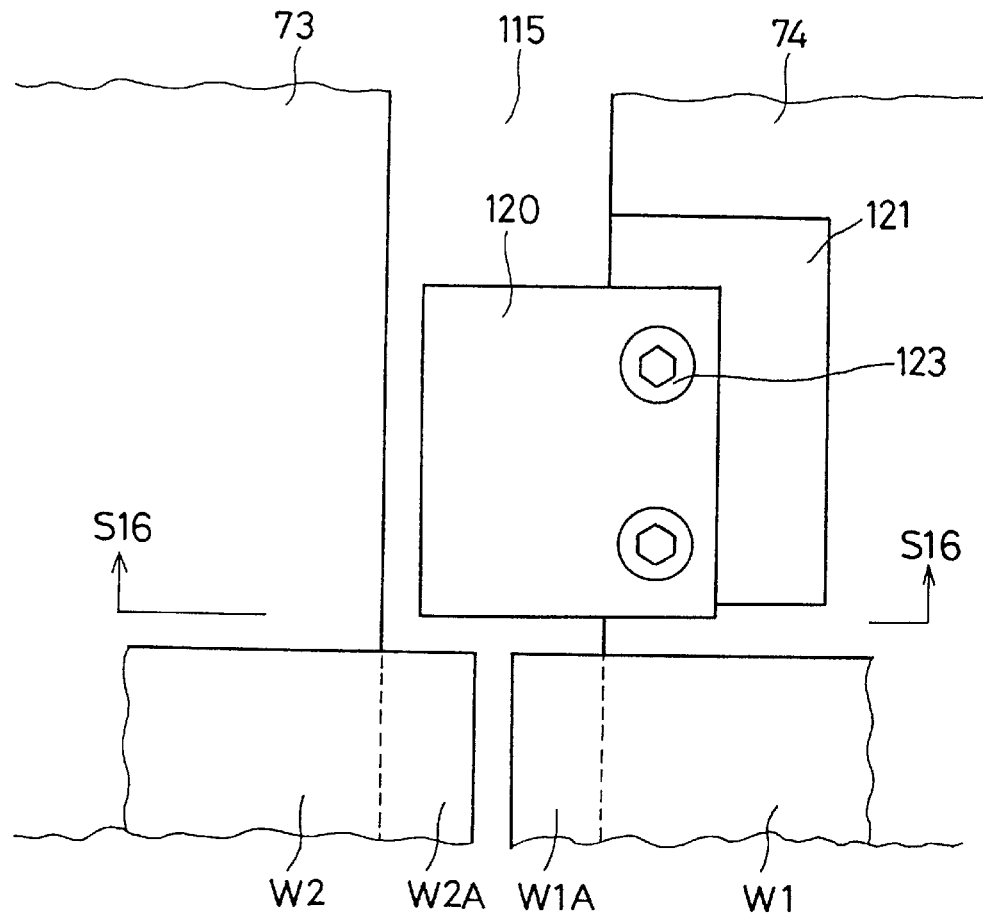
F I G. 1 6
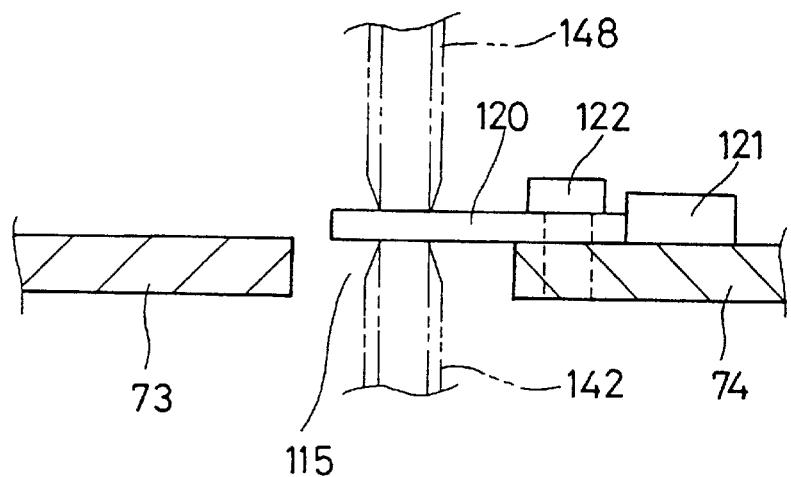

F I G. 2 3
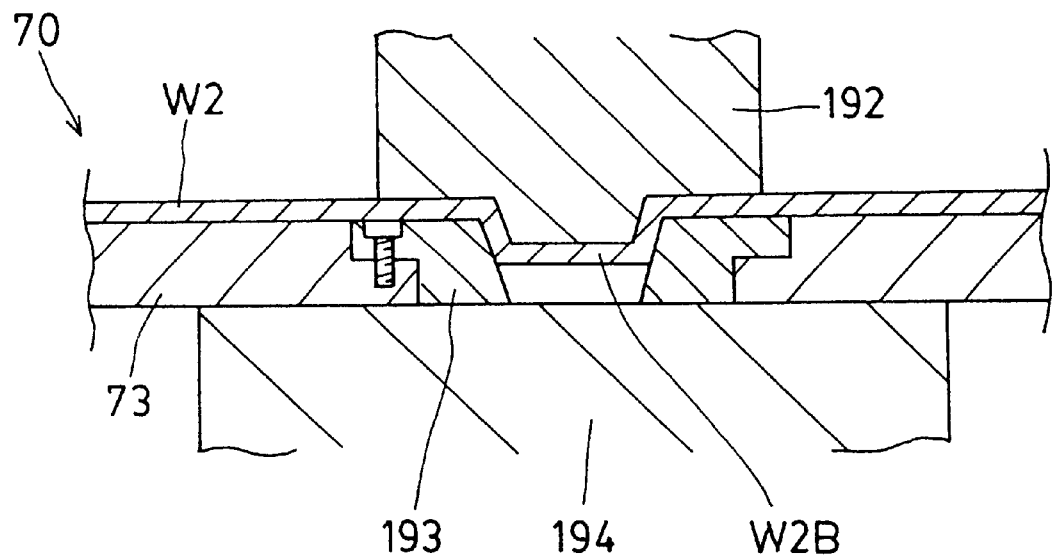
F I G. 2 4
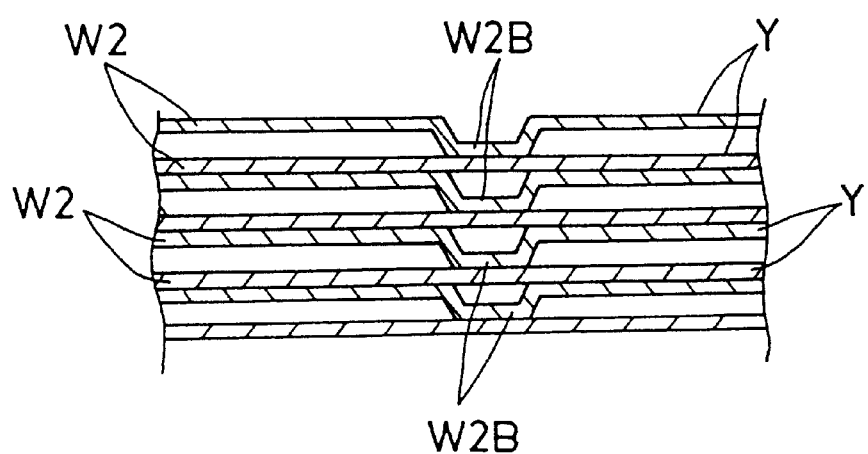

DEVICE AND METHOD FOR SEAMING WELDING

TECHNICAL FIELD

This invention relates to a seam welding apparatus and a seam welding method for seam-welding a plurality of blanks, and is intended particularly to be used in a mash-seam welding operation or in a general seam welding operation for manufacturing a member to be a part of a car body of an automobile and the like.

BACKGROUND ART

A seam welding operation of joining a plurality of blanks is performed by overlapping respective end portions of the blanks to be joined together, clamping the respective blanks to these positions, and thereafter, seam-welding the respective end portions of the blanks by a pair of electrode rollers of a seam welding machine with its forward movement. Thereby, a finished product made of the plurality of the blanks is manufactured, and after the welding, the seam welding machine moves backward and the clamp is released. Thereafter, in the conventional art, the finished product is hung up by being attached by suction to suction means of a carrying device in an welding area where the plurality of the blanks are seam-welded, and carried from the welding area to another area by the carrying device.

Based on the conventional art, since the finished product having a size almost equal to the total size of the blanks is hung up by being attached by suction to the suction means of the carrying device in the welding area, the welding area needs to be a space with its top open widely.

However, it is sometimes necessary to dispose various members, devices and the like for moving the seam welding machine forward/backward and for other reasons in the welding area. In such cases, it is impossible to keep the welding area to be the space with its top open widely, and it is necessary to work out ways of carrying the finished product from the welding area to the other area and disposing the various members, devices and the like which are necessary for the welding area, even when the welding area is the space in the above condition.

An object of the present invention is to provide a seam welding method and a seam welding apparatus for carrying out the welding method, which is capable of carrying the finished product made of the plurality of the blanks from the welding area to the other area, even though the various members and devices which are necessary for the area are disposed in the welding area for seam-welding the plurality of the blanks.

DISCLOSURE OF THE INVENTION

A seam welding apparatus according to the present invention comprises a transfer table having a jig member for putting a plurality of blanks thereon and being movable between a standby area and an welding area, a moving device to allow the transfer table to reciprocate horizontally between the standby area and the welding area, a clamping device disposed in the welding area for clamping the plurality of the blanks with these end portions overlapped one another in positional relations for seam-welding the respective end portions in the welding area, and a seam welding machine being movable forward/backward to the welding area for seam-welding the respective end portions.

According to the seam welding apparatus, the plurality of the blanks to be seam-welded are put on the jig member on the transfer table and sent from the standby area to the welding area, and after the seam welding, a finished product made of the plurality of the blanks is similarly put on the jig member on the transfer table and returned to the standby area. Further, the transfer table horizontally reciprocates between the standby area and the welding area by the moving device.

Therefore, even when various members, devices and the like which are necessary for moving the seam welding machine forward/backward and for other reasons are disposed in the welding area, and hence the welding area becomes a space without its top open widely, it becomes possible to send the plurality of the blanks into the welding area and to send the finished product made of the blanks out of the welding area, and to dispose the members, devices and the like which are necessary for the welding area.

Moreover, in the seam welding apparatus, the finished product which is manufactured in the welding area by the plurality of the blanks is returned to its original standby area from which the blanks are sent to the welding area so that an opposite area to the standby area with the welding area therebetween can be freely used.

When a temporary clamping device for temporarily clamping the plurality of the blanks is disposed on the transfer table of the seam welding apparatus according to the present invention, the plurality of the blanks can be temporarily clamped before these are sent from the standby area to the welding area by the transfer table, and hence the plurality of the blanks which are sent to the welding area while being temporarily clamped can be permanently clamped by the aforesaid clamping device and seam-welded in the welding area.

Further, when a lapping device for overlapping the respective end portions of the plurality of the blanks to be seam-welded is disposed to the transfer table of the seam welding apparatus, it is possible to temporarily clamp the blanks by the temporary clamping device after the respective end portions of the plurality of the blanks are overlapped by the lapping device in the welding area.

Thereby, it becomes unnecessary to dispose the lapping device in the welding area, and hence the many more members, devices and the like of various kinds which are necessary for the seam welding can be disposed in the welding area.

Moreover, with the seam welding apparatus according to the present invention, there are two of the jig members provided on the transfer table for putting the plurality of the blanks thereon and disposed with a gap therebetween, and a position of the gap when the transfer table reaches the welding area and stops therein corresponds to a position in which the seam welding machine moves forward/backward, and an electrode roller lying-on member with a part thereof projecting into the gap is disposed on at least one of the two jig members, and the electrode roller lying-on member onto which an upper electrode roller lies, out of two upper/lower electrode rollers of the seam welding machine for seam-welding the respective end portions of the plurality of the blanks, is disposed at a position opposing to at least one of start part side and end part side of welding of the plurality of the blanks.

According to the electrode roller lying-on member, when the electrode roller lying-on member is disposed at the position opposing to the start part side of the welding, the two upper/lower electrode rollers abut against the lying-on member and move to the overlapped end portions of the plurality of the blanks to start the seam welding by pressurizing the end portions. Meanwhile, when the electrode roller lying-on member is disposed at the position opposing to the end part side of the welding, the two upper/lower electrode rollers move to the lying-on member after pressurizing the overlapped end portions of the plurality of the blanks to complete the seam welding. Therefore, the start part and the end part of the welding of the respective end portions of the plurality of the blanks can be prevented from being mashed and deformed.

It is suitable to provide one transfer table of the seam welding apparatus according to the present invention. It is also suitable that the standby areas are disposed at two spots of both sides of the welding area, the two transfer tables are provided, and the moving device allows one of the transfer tables to reciprocate between one of the two standby areas and the welding area and the other transfer table to reciprocate between the other standby area and the welding area.

When there are two transfer tables, the seam welding operation can be performed efficiently by making good use of the transfer tables.

The upper electrode roller out of the two upper/lower electrode rollers of the seam welding machine of the seam welding apparatus is pressed downwardly by pressing means for pressurizing the overlapped end portions of the plurality of the blanks. A structure is disposed in the welding area in which the seam welding machine moves forward/backward and upward reactive force occurring when the upper electrode roller is pressed downwardly by the pressing means is received by the structure.

Thereby, it is not necessary to provide a C-shaped frame having high strength for supporting the upward reactive force to the seam welding machine itself. Therefore, it is possible to make the total weight of the seam welding apparatus lighter.

In the seam welding apparatus, the pressing means for pressing the upper electrode roller downwardly may be a cylinder, a solenoid, a spring or a feed screw, and may be one combining at least two of the above.

Moreover, in the seam welding apparatus, it is suitable to provide at least one guide rail extending in a forward/backward direction of the seam welding machine to guide its forward/backward movement to the structure, and to allow the upward reactive force to act on the guide rail.

Thereby, a member of the structure for receiving the upward reactive force and a member for guiding the forward/backward movement of the seam welding machine are shared with one another, and the forward/backward movement of the seam welding machine can be performed while supporting the upward reactive force by the member of the structure which is disposed in the welding area.

The structure disposed in the welding area can be freely structured as long as it can receive the upward reactive force. As an example, the structure is formed by including a plurality of columns being provided to stand and spaced out in a forward/backward direction of the seam welding machine and a beam being provided suspendedly between upper ends of the columns.

Thus, the shape of the structure can be simply formed by the columns and the beam, and it can be structured to be able to support effectively the upward reactive force with high strength. Further, when the aforesaid guide rail onto which the upward reactive force acts is provided to the structure, the guide rail can be attached to the beam.

Furthermore, the clamping device for clamping the plurality of the blanks with these end portions overlapping one another in the welding area can be attached to the structure.

Being structured as above, the clamping device which is necessary for clamping the plurality of the blanks with these end portions overlapping one another in the seam welding as they are, and must be disposed in the welding area, can be disposed in the welding area by utilizing the structure. Further, the reactive force of the clamp occurs to the clamping device when the blanks are clamped, and the reactive force of the clamp can be effectively supported by the structure having high strength.

In the welding area, detecting means is disposed for detecting lapping amounts of the overlapped end portions of the plurality of the blanks before the seam welding is performed.

Thereby, the lapping amounts of the respective end portions of the plurality of the blanks before the seam welding can be automatically detected by the detecting means. When the detected lapping amounts are the amounts within allowance, the seam welding apparatus continues its automatic operation to perform the seam welding operation, and as this result, it is possible to manufacture the finished product with a predetermined seam welding strength. When the detected lapping amounts include an error exceeding the allowance, the seam welding apparatus can be stopped to perform an operation of changing the lapping amount to a value within the allowance.

The detecting means of the lapping amount may be a contacting type in which a contacting member such as a finger touches the blanks, but it is preferable to provide a non-contacting type using photographing means such as a camera and electrical means such as a capacitor.

When the non-contacting type detecting means of the lapping amount is used, a problem such as an wear-out of the detecting means can be prevented from occurring.

When using the camera as the detecting means, it is suitable to dispose the two cameras at both edges of the end portions of the plurality of the blanks to be seam-welded on forward/backward sides in a traveling direction of the seam welding machine so that the cameras detect the lapping amounts at the both edges thereof.

Thereby, it is possible to detect by the two cameras whether the lapping amounts of the linearly extending end portions of the plurality of the blanks across the whole length thereof are within a predetermined range or not.

In the above case, it is suitable to dispose the two cameras in a gap between the two jig members which are provided on the transfer table for putting the plurality of the blanks thereon, thereby detecting the lapping amounts.

Thus, the lapping amounts can be detected by effectively utilizing the gap between the two jig members as disposing positions of the cameras.

Further, when the detecting means of the lapping amounts are a plurality of cameras, the cameras may make a pair with two of these being disposed to upper/lower sides of the plurality of the blanks.

By providing a plurality of the pairs of the cameras in the traveling direction of the seam welding machine, the overlapping amounts can be detected at plural positions in an extending direction of the end portions of the blanks.

The detecting means of the overlapping amount may be disposed fixedly at a predetermined position in the welding area, but may be movable forward to and backward from the blanks to be seam-welded, and perform a detecting operation by moving forward when detecting the lapping amount.

Thereby, by moving the detecting means backward when the plurality of the blanks are sent to the welding area by the transfer table, the blanks are sent by the transfer table without being obstructed by the detecting means.

When the plurality of the blanks to be seam-welded by the aforesaid seam welding machine are two blanks with different thicknesses, protrusion forming means for forming a protrusion in the blank with smaller thickness is disposed in the welding area.

When the finished product is manufactured by the seam welding of the two blanks, the protrusion forming means forms the protrusion in the blank with smaller thickness which forms the finished product. Thereby, when the manufactured finished products in a multiple number are multi-tiered in an area other than the welding area, heights of the blanks with larger thickness and the blanks with smaller thickness in the finished products become equal or almost equal to each other due to the protrusions, and the finished products are in a horizontal state or almost horizontal state as a whole, and hence the uppermost finished product can be sucked and carried successively by carrying means which includes suction instruments at positions corresponding to the blanks.

The protrusion forming means can be operated every time the finished product is manufactured by the two blanks being seam-welded by the seam welding machine, or it can be operated every time a predetermined number of the finished products are manufactured by the two blanks.

In the latter case, the finished products with the formation of the protrusions and the finished products without the formation of the protrusions exist in the multi-tiered finished products, and the finished products without the formation of the protrusions exist between the finished products with the formation of the protrusions. Therefore, it can be prevented that the respective protrusions fit to each other to lower the height in the area of the blanks with smaller thickness, even though the protrusions have shapes which protrude downwardly and have hollows on its upper surfaces.

A driving force of the protrusion forming member for forming the protrusion in the blanks with smaller thickness may be generated by a cylinder or a solenoid, and its structure, form and the like are optional.

A seam welding method according to the present invention comprises the steps of supplying a plurality of blanks to the standby area, sending horizontally the blanks from the standby area to the welding area, clamping the plurality of the blanks with these end portions overlapping one another in positional relations for seam-welding the respective end portions, seam-welding the respective end portions by the seam welding machine in the welding area, releasing the clamp thereafter, returning horizontally a finished product made of the plurality of the blanks from the welding area to the standby area, and carrying the finished product from the standby area to another area.

According to the seam welding method, the plurality of the blanks to be seam-welded to become the finished product are horizontally sent from the standby area to the welding area, and after the seam welding, the finished product made of the plurality of the blanks is horizontally returned from the welding area to the standby area. Hence, it is unnecessary to prepare the space with its top open widely for the welding area, different from the case of sucking and hanging up the finished product by the suction means of the carrying device in the welding area. Therefore, the various members, devices and the like which are necessary for moving the seam welding machine forward/backward and for other reasons can be effectively disposed in the welding area, and the structure of the welding area in the entire seam welding apparatus which is structured by including the seam welding machine can be freely designed.

Moreover, in the seam welding apparatus, the finished product which is manufactured in the welding area by the plurality of the blanks is returned to its original standby area from which the blanks are sent to the welding area, and hence it is possible to freely use the opposite area to the standby area with the welding area therebetween.

In the seam welding method, it is suitable that the respective end portions of the plurality of the blanks are not overlapping and hence the blanks are not clamped when they are sent from the standby area to the welding area, and the respective end portions of the blanks are overlapping to be clamped for the seam welding after the plurality of the blanks are sent to the welding area. Meanwhile, it is also suitable that the respective end portions of the plurality of the blanks are overlapping and temporarily clamped in the standby area, and the plurality of the blanks are sent to the welding area while being temporarily clamped to be subjected to a permanent clamp as the aforesaid step of clamping in the welding area.

In the latter case, an operation of overlapping the respective end portions of the blanks for the seam welding can be performed beforehand in the standby area, not in the welding area, and it becomes unnecessary to dispose the lapping device for this lapping operation in the welding area. Therefore, the various members, devices and the like for moving the seam welding machine forward/backward and for other reasons can be disposed in the welding area in a more effective manner.

Further, it is suitable to return the finished product without clamping it when the finished product which is manufactured in the welding area is returned from the welding area to the standby area, but in case the blanks are temporarily clamped by the temporary clamping device when the plurality of the blanks are sent from the standby area to the welding area, it is also suitable to return the finished product from the welding area to the standby area while clamping the finished product by the temporary clamping device.

Thereby, the finished product can be returned from the welding area to the standby area while maintaining its position at a predetermined position because of the clamp by the temporary clamping device, and a positioning of the finished product which is necessary when the finished product is sent from the standby area to the other area can be operated.

Further, when the plurality of the blanks are temporarily clamped in the welding area like the above, it is suitable that the standby areas are disposed at two spots of both sides of the welding area, and in permanently clamping and seam-welding in the welding area the plurality of the blanks temporarily clamped in one standby area, a plurality of blanks to be succeedingly subjected to the seam welding are temporarily clamped in the other standby area, and the finished product made of the plurality of the blanks being seam-welded in the welding area is returned from the welding area to the one standby area after releasing the permanent clamp, and in sending the plurality of the blanks temporarily clamped in the other standby area to the welding area for the permanent clamp and seam-welding the blanks in the welding area, a plurality of blanks to be succeedingly subjected to the seam welding are temporarily clamped in the one standby area, and the finished product made of the plurality of the blanks being seam-welded in the welding area is returned from the welding area to the other standby area after releasing the permanent clamp, and the plurality of the blanks temporarily clamped in the one standby area are sent to the welding area for the permanent clamp, and the above operations are repeated.

Thus, when the seam welding operation is continuously performed by sending the plurality of the blanks from the two standby areas to the welding area by turns, the overlapping operation of the respective end portions of the plurality of the blanks to be succeedingly seam-welded and the temporary clamping operation thereof can be performed beforehand while the seam welding operation of the plurality of the blanks is performed in the welding area, which makes it possible to increase a number of the finished products which can be manufactured in a predetermined time and to improve manufacturing efficiency.

When the plurality of the blanks which are seam-welded in the welding area are the two blanks with different thicknesses, the protrusion forming means forms the protrusion in the blank with smaller thickness out of the two blanks after being seam-welded by the seam welding machine with its forward movement, when the seam welding machine is moving to return to its backward position.

Since the protrusion forming means forms the protrusion in the blank with smaller thickness by utilizing the time when the seam welding machine is moving back to its backward position after the seam welding machine moves forward to complete the seam welding, the working time can be effectively utilized and the entire working time is not lengthened.

When the finished products which are made of the two blanks by the seam welding are multi-tiered in an area other than the welding area, and the protrusions which are formed by the protrusion forming means in the blanks with smaller thickness protrude downwardly and have hollows on their upper surfaces, the protrusions are formed by the protrusion forming means every time the finished products of the predetermined number are manufactured.

Thereby, it can be prevented that the respective protrusions fit to each other to lower the height in the area of the blanks with smaller thickness.

The seam welding by the seam welding machine according to the present invention may be a mash-seam welding which mashes the overlapped end portions of the plurality of the blanks, or may be a normal seam welding which does not mash these

BRIEF DESCRIPTION OF DRAWINGS

FIG. 1 is a schematic plane view of a layout showing positions of areas which form respective sections of a seam welding apparatus according to an embodiment of the present invention;

FIG. 15 is an enlarged plane view of an electrode roller lying-on member in FIG. 7 at a position where it is disposed;

FIG. 16 is a sectional view taken along the S16—S16 line in FIG. 15;

FIG. 23 is a vertical sectional view showing an operation for forming a protrusion in one of the two blanks;

FIG. 24 is a vertical sectional view showing a situation when the finished products manufactured by seam-welding the two blanks are multi-tiered and an enlarged view of areas of the blanks where the protrusions are formed;

BEST MODE FOR CARRYING OUT THE INVENTION

Preferred embodiments will be described with reference to the attached drawings in order to explain the present invention in detail.

A seam welding apparatus according to the following embodiments is for manufacturing a sheet-metal finished product to be a part of a car body of an automobile by joining a plurality of blanks by a mash-seam welding.

FIG. 1 is a schematic plane view of a layout showing positions of areas which form respective sections of the seam welding apparatus, in order to explain a general structure of the seam welding apparatus according to this embodiment. Next to an welding area A for seam-welding a plurality of the blanks, standby areas B for making the blanks on standby until they are sent to the welding area A are provided. Areas C and D are provided at forward/backward positions of the standby areas B and at positions deviated from positions next to the welding area A, in which the areas C are forward areas of blank supply carriages, and the areas D are forward areas of carriages for removing the finished product. Backward areas E, F of the blank supply carriages are connected to the forward areas C of the blank supply carriages in positional relations perpendicular to each other with respect to the areas C, and backward areas G, H of the carriages for removing the finished product are also connected to the areas D for removing the finished product in positional relations perpendicular to each other with respect to the areas D.

The standby areas B are provided at two spots of both right and left sides of the welding area A, and the plurality of the blanks to be seam-welded are allowed to be sent from these standby areas B by turns to the welding area A. Further, the areas C, the areas D, the areas E, F, and the areas G, H are also disposed at two spots which are in positional relations symmetrical to each other with respect to the welding area A, respectively. Therefore, the areas B to H, except for the welding area A, are provided at the two spots, respectively.

Figure 2:
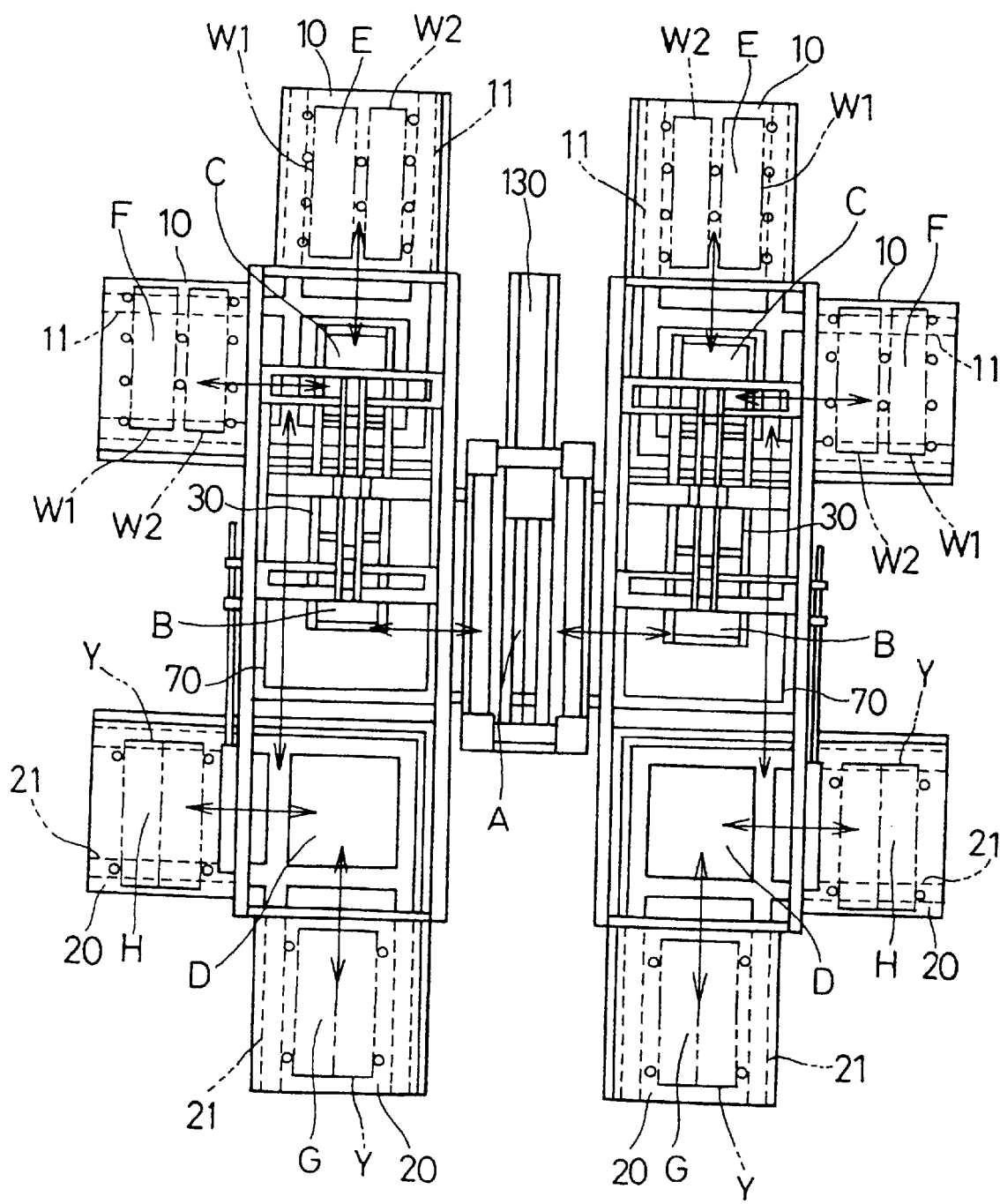
FIG. 2 is a plane view of the entire seam welding apparatus which has the respective areas shown in FIG. 1.

FIG. 2 is a plane view showing the entire seam welding apparatus according to this embodiment which has the respective areas shown in FIG. 1, and moving means of the blanks and the finished products used in the respective sets of the areas B to H which are provided on the respective sides of the welding area A are the same with each other.

Figure 3:
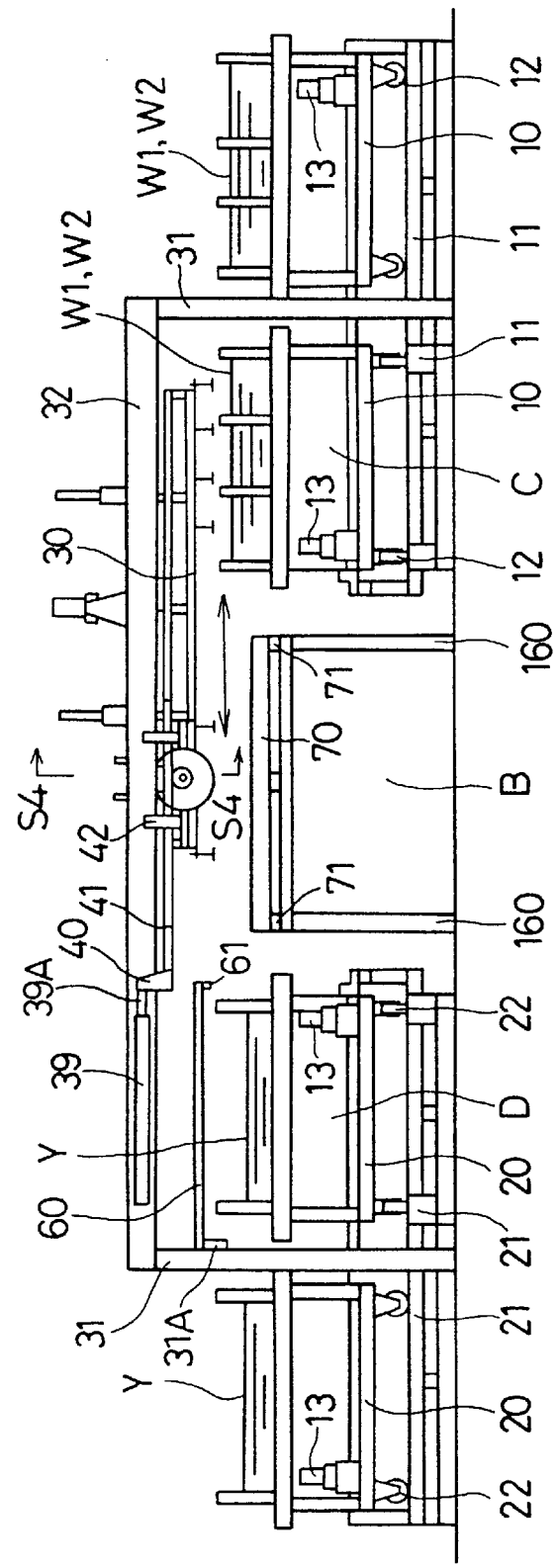
FIG. 3 is a side view of the seam welding apparatus.
Figure 4:
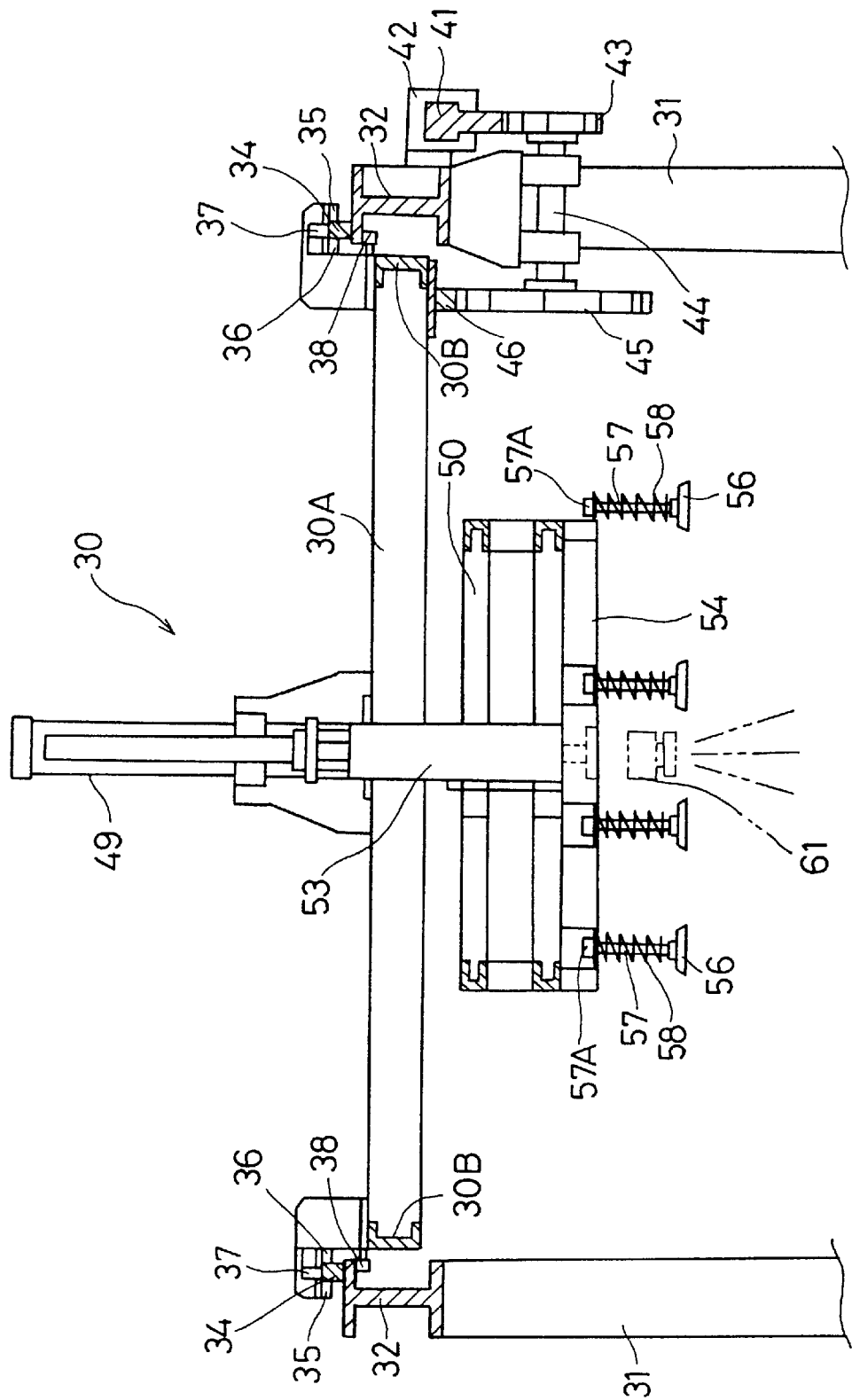
FIG. 4 is a sectional view taken along the S4—S4 line in FIG. 3.
Figure 5:
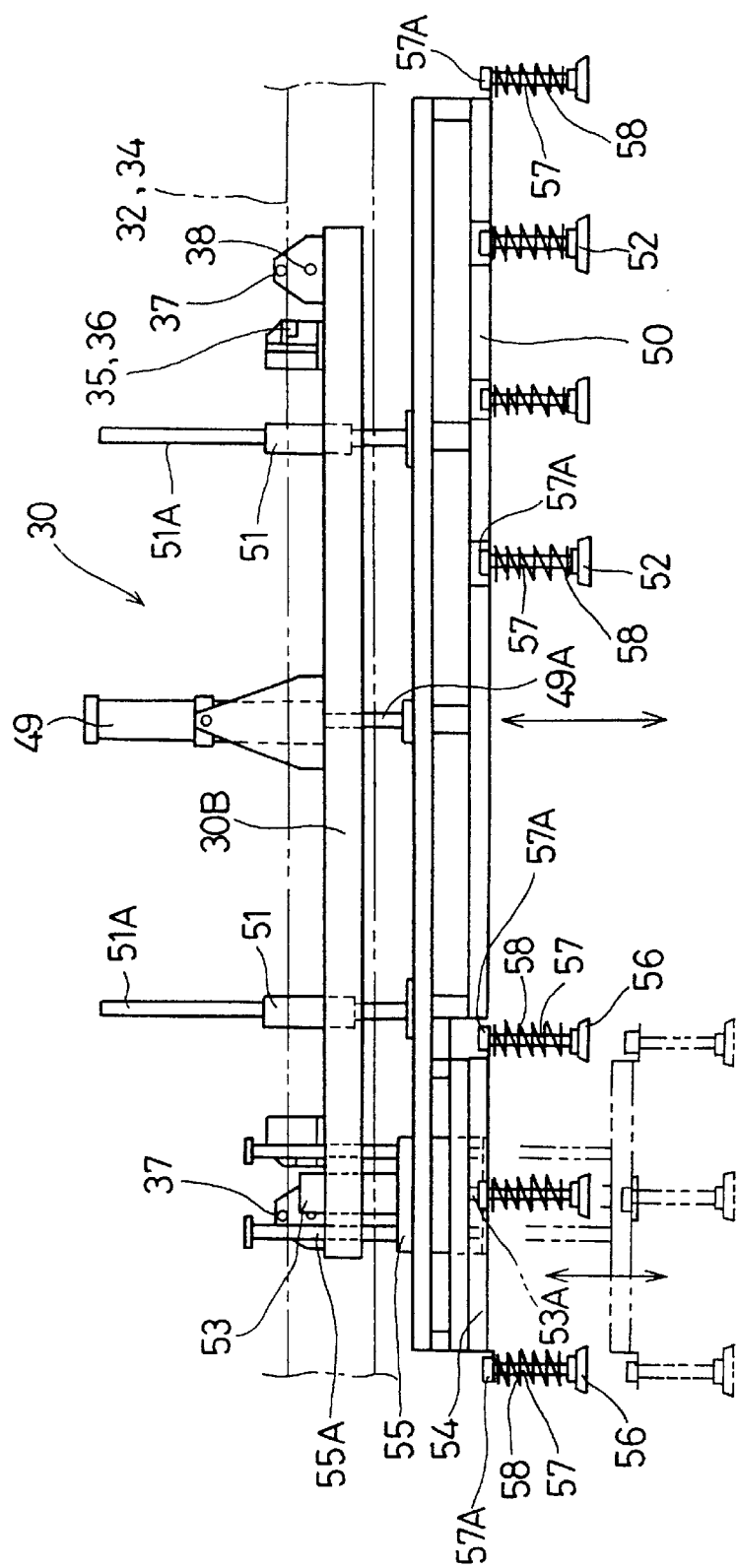
FIG. 5 is a side view of a carrier shown in FIG. 3.
Figure 6:
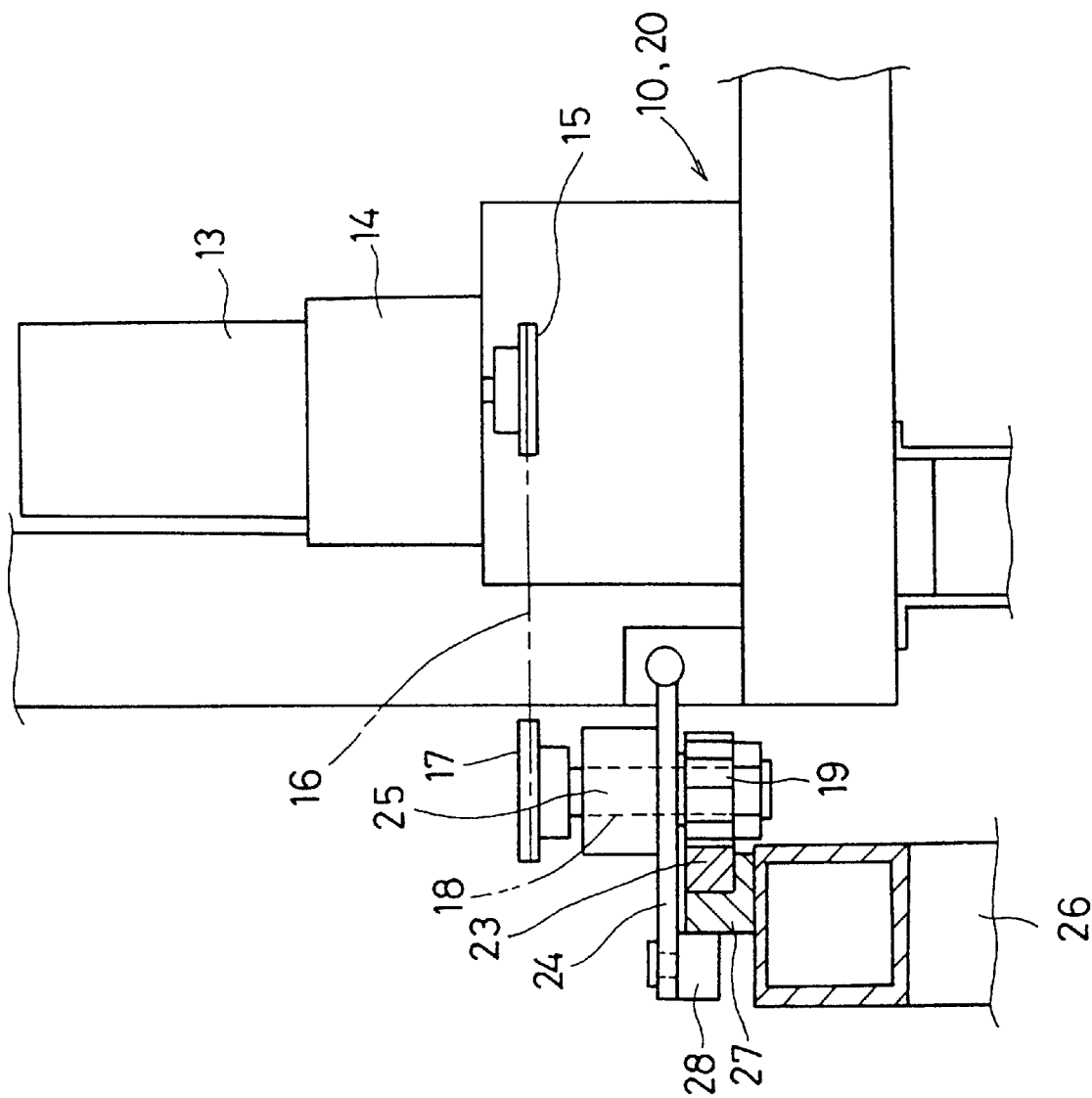
FIG. 6 is an enlarged view of a driving device of a blank supply carriage and a carriage for removing a finished product shown in FIG. 3.

In explanation of the moving means, two blank supply carriages 10 are disposed between the area C and the areas E, F to freely reciprocate while being guided by rails 11, and blanks W1, W2 to be joined together by the seam welding and make a pair with two of them are loaded onto the carriages 10 in multiple pairs while being spaced out from each other, and the blanks W1, W2 are supplied to the forward area C by the carriages 10 moving forward to the area C. The structure of the carriage 10 is shown in FIG. 3 and FIG. 6. A carrier 30 is disposed to freely reciprocate in a direction parallel to the area C, the area B and the area D, and the carrier 30 moves from the area C side to the area D side, thereby carrying the blanks W1, W2 to the standby area B, which are on the carriage 10 reaching the area C, and carrying a finished product Y to the area D, which have been manufactured by the blanks W1, W2 in the area A and returned to the standby area B. The structure of the carrier 30 is shown in FIG. 3 to FIG. 5. Between the area D and the areas G, H, two carriages 20 for removing the finished product are disposed to freely reciprocate while being guided by rails 21, so that the finished product Y is delivered from the carrier 30 to the carriage 20 by the carriage 20 moving forward to the area D, and the finished product Y is carried out of the carriage 20 to the other place by the carriage 20 moving backward to the areas G, H. The structure of the carriage 20 is shown in FIG. 3 and FIG. 6.

Figure 7:
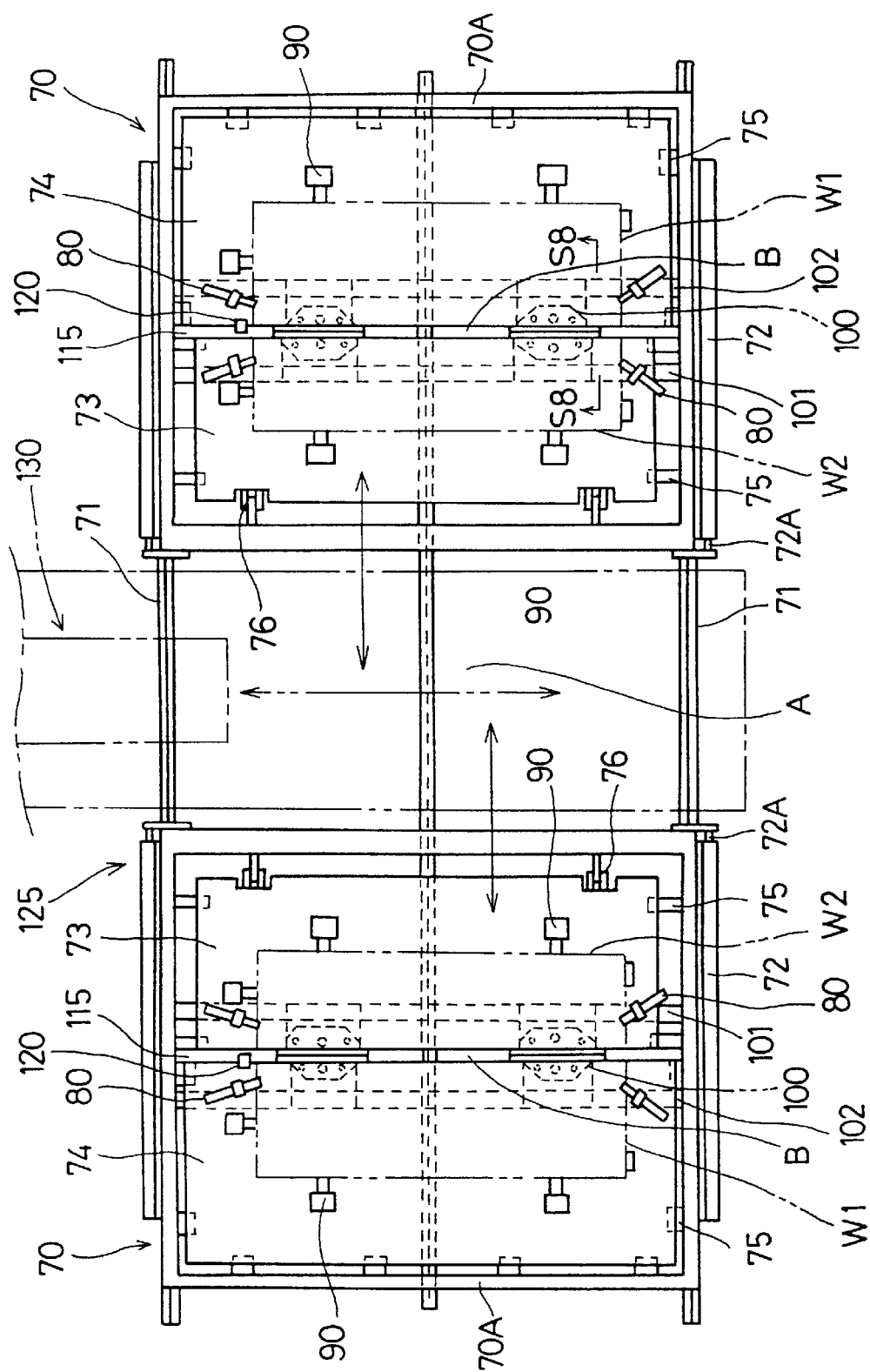
FIG. 7 is a plane view of two transfer tables shown in FIG. 2.
Figure 17:
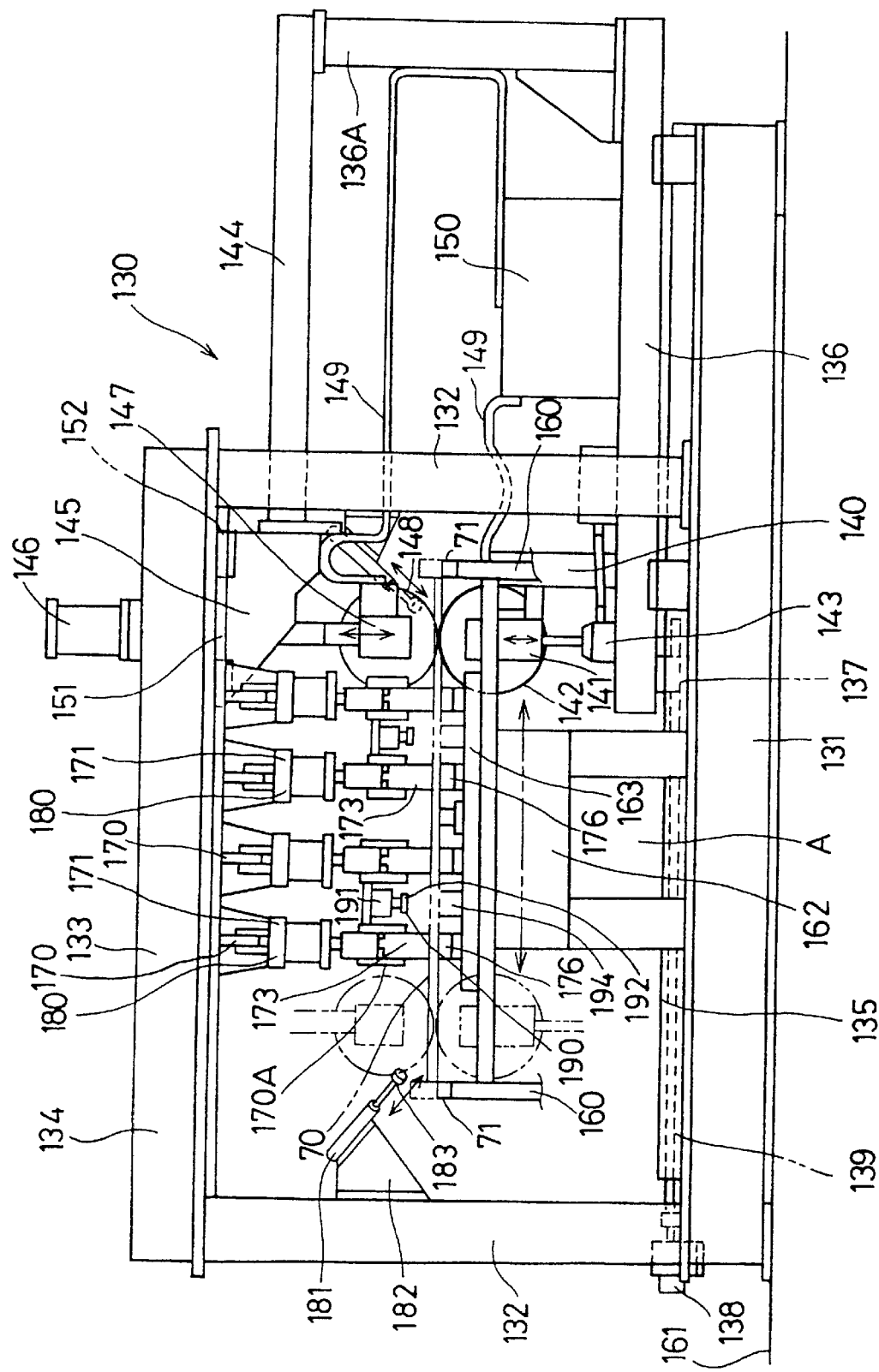
FIG. 17 is a side view of a seam welding machine.
Figure 18:
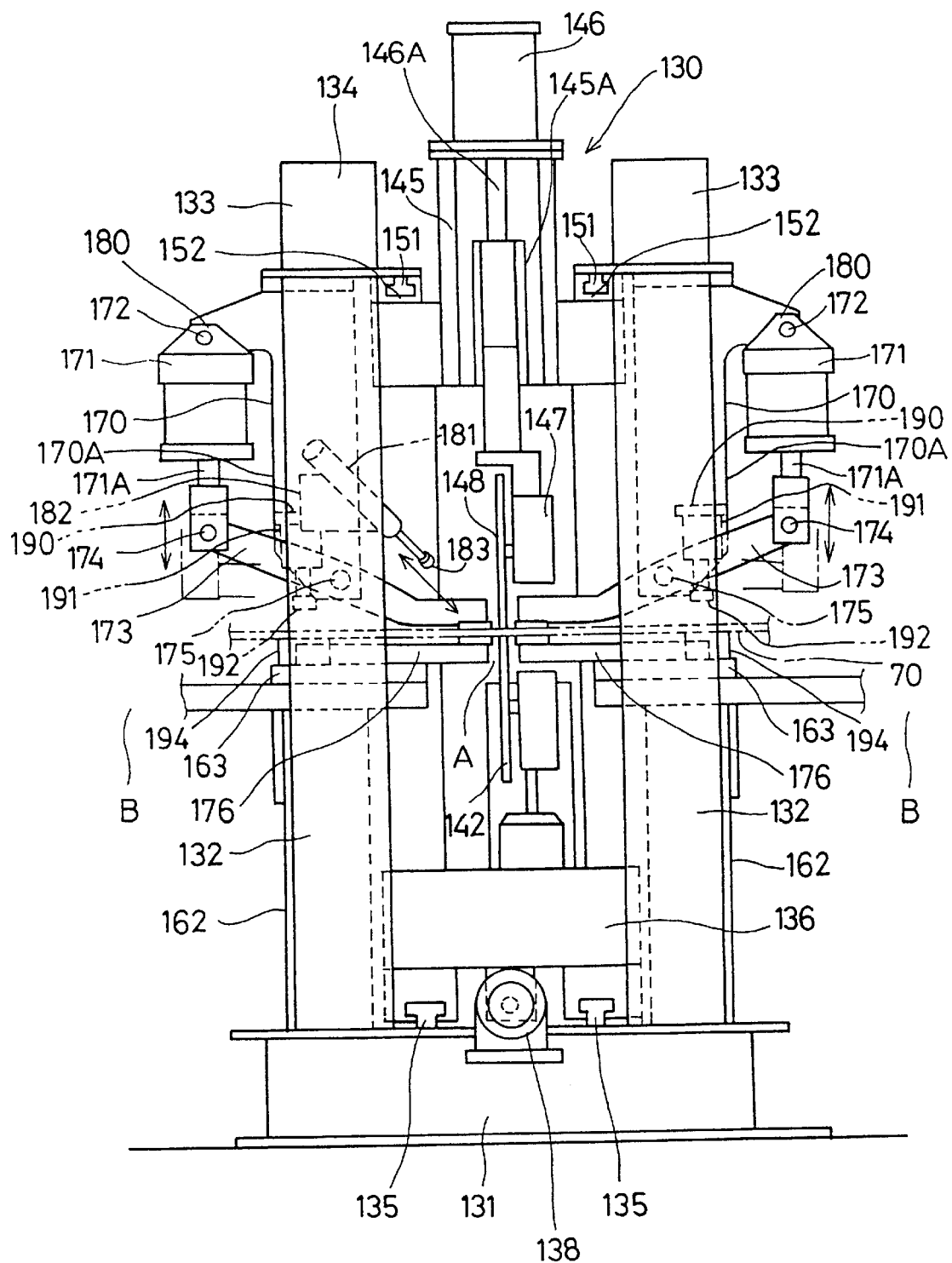
FIG. 18 is a front view of the seam welding machine.

Between the standby area B and the welding area A, a transfer table 70 is disposed to freely reciprocate horizontally, and when the transfer table 70 reaches the standby area B, the blanks W1, W2 are supplied from the carrier 30 to the transfer table 70, and when the transfer table 70 moves to the welding area A, these blanks W1, W2 are subjected to the seam welding by a seam welding machine 130 which can freely move forward/backward to/from the welding area A, and particularly, these are subjected to the mash-seam welding in this embodiment. Thereby, the finished product Y whose thickness in its welded part is smaller than the total thickness of the blanks W1, W2 is manufactured. Further, when the transfer table 70 returns to the original standby area B, the finished product Y is returned from the welding area A to the standby area B and the finished product Y is carried to the area D by the carrier 30. The transfer table 70 is shown in FIG. 7 and two of these are disposed, which is the same number with that of the areas B. The seam welding machine 130 is shown in FIG. 17, FIG. 18.

FIG. 3 is a side view of the seam welding apparatus, in which the blank supply carriages 10 and the carriages 20 for removing the finished product travel along the rails 11, 21 by wheels 12, 22. These travels are driven by driving devices 13 which are mounted on the carriages 10, 20, and the driving device 13 is shown in FIG. 6. The driving device 13 is structured by a servomotor 14, a rotating shaft 18 which is connected to a driving shaft of the servomotor 14 through a sprocket 15, a chain 16 and a sprocket 17, a pinion 19 which is fixed to the rotating shaft 18, and a rack 23 with which the pinion 19 meshes. The rotating shaft 18 is held rotatably by a shaft receiving member 25 which is coupled to the carriages 10, 20 by a coupling member 24, and the rack 23 which extends in a traveling direction of the carriages 10, 20 is attached to a guide member 27 which is fixed to upper ends of a plurality of columns 26 provided to stand at positions slightly spaced from traveling tracks of the carriages 10, 20. A roller 28 which abuts against a rear surface of the guide member 27 is rotatably attached to the coupling member 24, and the pinion 19 surely meshes with the rack 23 by the abutment of the roller 28 against the guide member 27. Thereby, the carriages 10, 20 travel by the rotation of the pinion 19 which is driven by the servomotor 14.

The carrier 30 is shown in FIG. 3, FIG. 4 and FIG. 5. FIG. 4 is a sectional view taken along the S4—S4 line in FIG. 3, and FIG. 5 is a side view of the carrier 30. As shown in FIG. 3, horizontal beams 32 which are supported by a plurality of columns 31 are provided suspendedly from the area C to the area D, and the horizontal beams 32 are disposed at both right and left sides of the carrier 30 as shown in FIG. 4. The carrier 30 has lateral girders 30A which extend to the horizontal beams 32, and rollers 35, 36 which sandwich the guide rails 34 being fixed to upper surfaces of the horizontal beams 32 of H-steel from both right and left sides, rollers 37 which are put on upper surfaces of the guide rails 34, and rollers 38 which abut against lower surfaces of upper flanges of the horizontal beams 32 are rotatably attached to longitudinal girders 30B which are connected to both end parts of the lateral girders 30A which are provided in a plural number in a moving direction of the carrier 30. The carrier 30 is allowed to freely reciprocate between the area C and the area D while being positioned and its weight being supported by these rollers 35 to 38.

At a side of the horizontal beam 32, as shown in FIG. 3, a cylinder 39 is attached horizontally, and a rack 41 is connected to a piston rod 39A of the cylinder 39 through a coupling member 40. The rack 41 which extends in the moving direction of the carrier 30 is horizontally supported by guide members 42, which are also shown in FIG. 4, and when the piston rod 39A of the cylinder 39 extends/retracts, the rack 41 also reciprocates horizontally. A pinion 43 which is rotatably attached to the horizontal beam 32 is meshed with the rack 41, and a pinion 45 is coupled to the pinion 43 by a coupling shaft 44, whereby these pinions 44, 45 rotate synchronously. The pinion 45 meshes with a rack 46 which is attached to a lower surface of the longitudinal girder 30B of the carrier 30 to extend toward the moving direction of the carrier 30. Thus, the pinions 44, 45 rotate by the extension/ retraction of the piston rod 39A of the cylinder 39, so that the carrier 30 moves along the horizontal beam 32.

As shown in FIG. 5, the carrier 30 includes a cylinder 49 which faces downward, a large frame 50 is connected to a piston rod 49A of the cylinder 49, and the large frame 50 moves up and down by extension/retraction of the piston rod 49A of the cylinder 49 while being guided by guide members 51 into which guide bars 51A are inserted. Near an end part of the large frame 50 on the area C side, a plurality of suction instruments 52 are disposed in the moving direction of the carrier 30 and in a horizontal direction which is perpendicular to the moving direction. These suction instruments 52 are vacuum suction instruments which attach the blanks W1, W2 and the finished product Y thereto by suction due to an aspiration function of a not-shown absorbing device and release the attachment by suction. Further, a cylinder 53 facing downward is attached to an end part of the large frame 50 on the area D side, and a small frame 54 is connected to a piston rod 53A of the cylinder 53. The small frame 54 moves up and down by expansion/contraction of the piston rod 53A while being guided by a guide member 55 into which guide bars 55A are inserted, in contrast to the large frame 50. A plurality of suction instruments 56 are also disposed to the small frame 54 in the moving direction of the carrier 30 and in the horizontal direction perpendicular to the moving direction. These suction instruments 56 are also vacuum suction instruments.

The respective suction instruments 52, 56 are provided at lower ends of rods 57 which are movable up and down and whose descent limits are decided by being locked with the large frame 50 and the small frame 54 at locking portions 57A of these upper ends, and coil springs 58 are wound around the rods 57.

Thereby, when the piston rod 49A of the cylinder 49 extends to lower the large frame 50, the suction instruments 52, 56 descend to be pressed against the blanks W1, W2 and the finished product Y by resilient force of the coil springs 58. Thus, the blanks W1, W2 and the finished product Y are attached by suction to the suction instruments 52, 56. Moreover, the rods 57 relatively rise with respect to the large frame 50 and the small frame 54, thereby absorbing a difference between a descending amount of the piston rod 49A and height positions of the blanks W1, W2 and the finished product Y. Further, as will be described later, even when there is a significant difference between the height positions of the blanks W1, W2 to be attached by suction to the suction instruments 52 and the height position of the finished product Y to be attached by suction to the suction instruments 56, the piston rod 53A of the cylinder 53 extends to lower the small frame 54 with respect to the large frame 50, thereby absorbing the difference as well.

As to the columns 31 on the area D side as shown in FIG. 3, there are two of these on the area B side and on the area A side, and a base end part of an arm 60 which extends toward the area B side is connected to a horizontal member 31A which is provided suspendedly between the columns 31, at the tip of which a rust-preventive oil blowout nozzle 61 is attached downwardly. As shown in FIG. 4, the nozzle 61 is disposed at the center of the four suction instruments 56 of the small frame 54 which are provided side by side in the horizontal direction perpendicular to the moving direction of the carrier 30. Therefore, the finished product Y is manufactured by joining the respective end portions of the blanks W1, W2 by the seam welding in the welding area A, attached by suction to the suction instruments 56 of the carrier 30 in the area B, and carried to the area D by moving the carrier 30 by the cylinder 39, and at this time, the finished product Y is allowed to be sent to the area D while being sprayed with the rust-preventive oil which is blown out from the nozzle 61 at the seam welded part of the finished product Y FIG. 7 is a plane view showing the two transfer tables 70 as shown in FIG. 2. These transfer tables 70 are put on the guide rails 71 to freely reciprocate, and the guide rails 71 pass through the welding area A to extend horizontally and continuously to the standby areas B which are disposed at both sides of the welding area A. Therefore, the guide rails 71 are common to these two transfer tables 70. The piston rods 72A of the cylinders 72 which are attached to the guide rails 71 are coupled to the respective transfer tables 70, and the transfer tables 70 reciprocate along the guide rails 71 by extension/retraction of the piston rods 72A. A range of the reciprocating motion of one transfer table 70 is between one standby area B and the welding area A, and a range of the reciprocating motion of the other transfer table 70 is between the other standby area B and the welding area A.

The two transfer tables 70 are identically structured. Namely, outer shapes of the respective transfer tables 70 are formed by outer frames 70A, two plate-shaped jig members 73, 74 for putting the blanks W1, W2 thereon are provided inside the outer frames 70A, and the jig members 73, 74 are supported horizontally by supporting members 75. One of the jig members 74 is not movable in its horizontal position, but the other jig member 73 is freely pivoted upwardly on hinges 76. Further, on upper surfaces of the jig members 73, 74, temporary clamping devices 80 for temporarily clamping the blanks W1, W2 and pushing devices 90 for pushing out the blanks W1, W2 are disposed in plural numbers, respectively. The temporary clamping device 80 is shown in FIG. 13, and the pushing device 90 is shown in FIG. 14.

Figure 13:
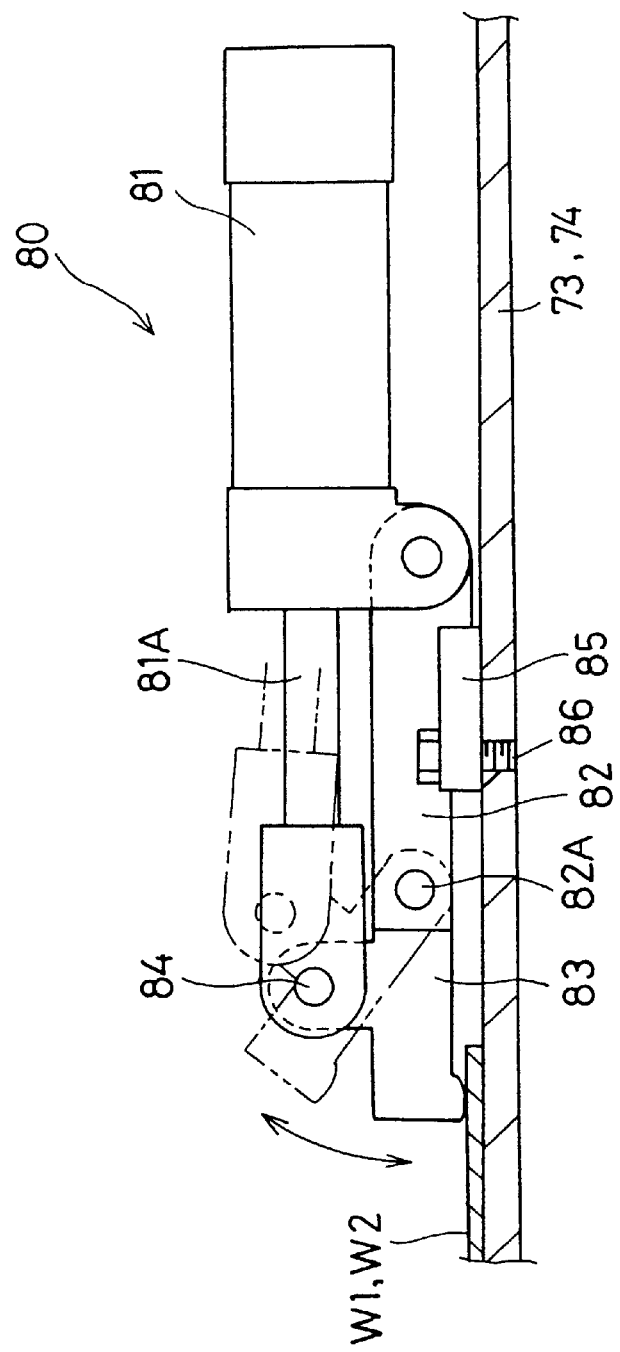
FIG. 13 is a view of a temporary clamping device shown in FIG. 7.

The temporary clamping device 80 in FIG. 13 is structured by a cylinder 81, a fulcrum member 82 which extends forwardly with its base end part coupled to the cylinder 81, a claw member 83 which can pivot freely up and down on a fulcrum shaft 82A at an end of the fulcrum member 82, a shaft 84 which couples a piston rod 81A of the cylinder 81 and the claw member 83 to pivot freely, and an attaching member 85 which is connected to the fulcrum member 82. By connecting the attaching member 85 to the jig members 73, 74 by a bolt 86, the temporary clamping device 80 is attached to the upper surfaces of the jig members 73, 74. Further, the claw member 83 pivots up and down on the fulcrum shaft 82A by extension/retraction of the piston rod 81A of the cylinder 81, and when the piston rod 81A extends, the claw member 83 presses the blanks W1, W2 against the jig members 73, 74 to clamp them temporarily.

Figure 14:
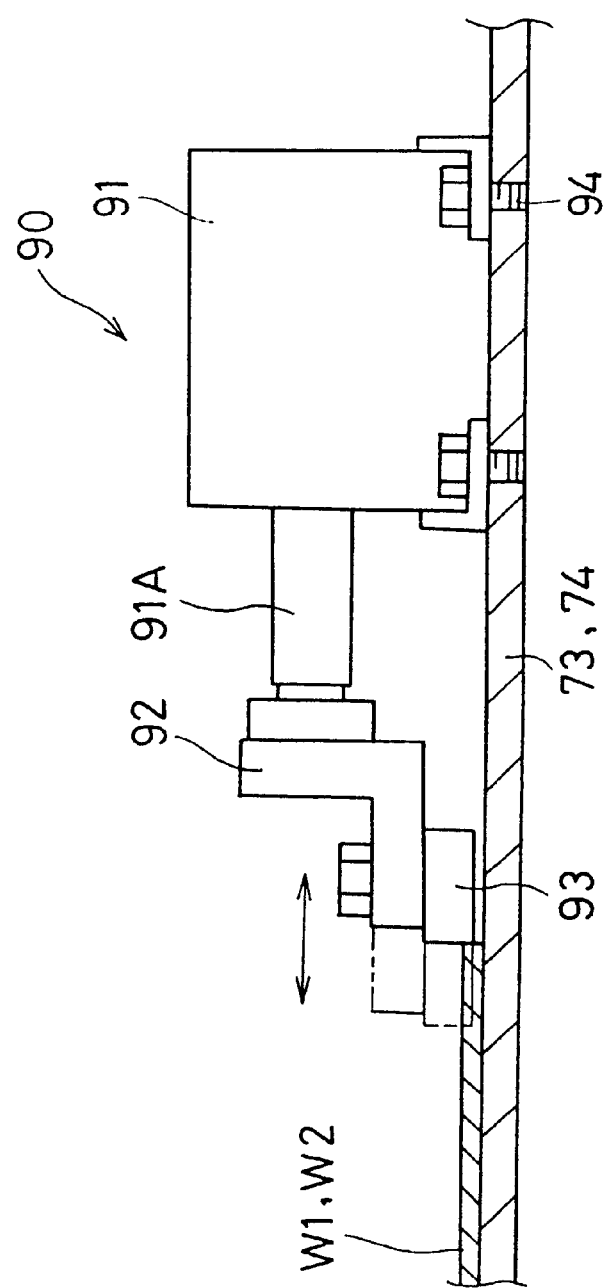
FIG. 14 is a view of a pushing device shown in FIG. 7.

The pushing device 90 in FIG. 14 includes a cylinder 91, a bracket 92 which is attached to a piston rod 91A of the cylinder 91, and a roller 93 which is attached to the bracket 92. By connecting the cylinder 91 to the jig members 73, 74 by bolts 94, the pushing device 90 is attached to the jig members 73, 74. Further, the piston rod 91A of the cylinder 91 extends to push end surfaces of the blanks W1, W2, whereby the blanks W1, W2 are pushed out forwardly.

On the respective transfer tables 70, as shown in FIG. 7, lapping devices 100 for overlapping the respective end portions of the blanks W1, W2 by a predetermined amount, which are to be seam-welded, are disposed. The lapping devices 100 are attached to longitudinal supporting members 101, 102 which are disposed underneath the jig members 73, 74.

Figure 8:
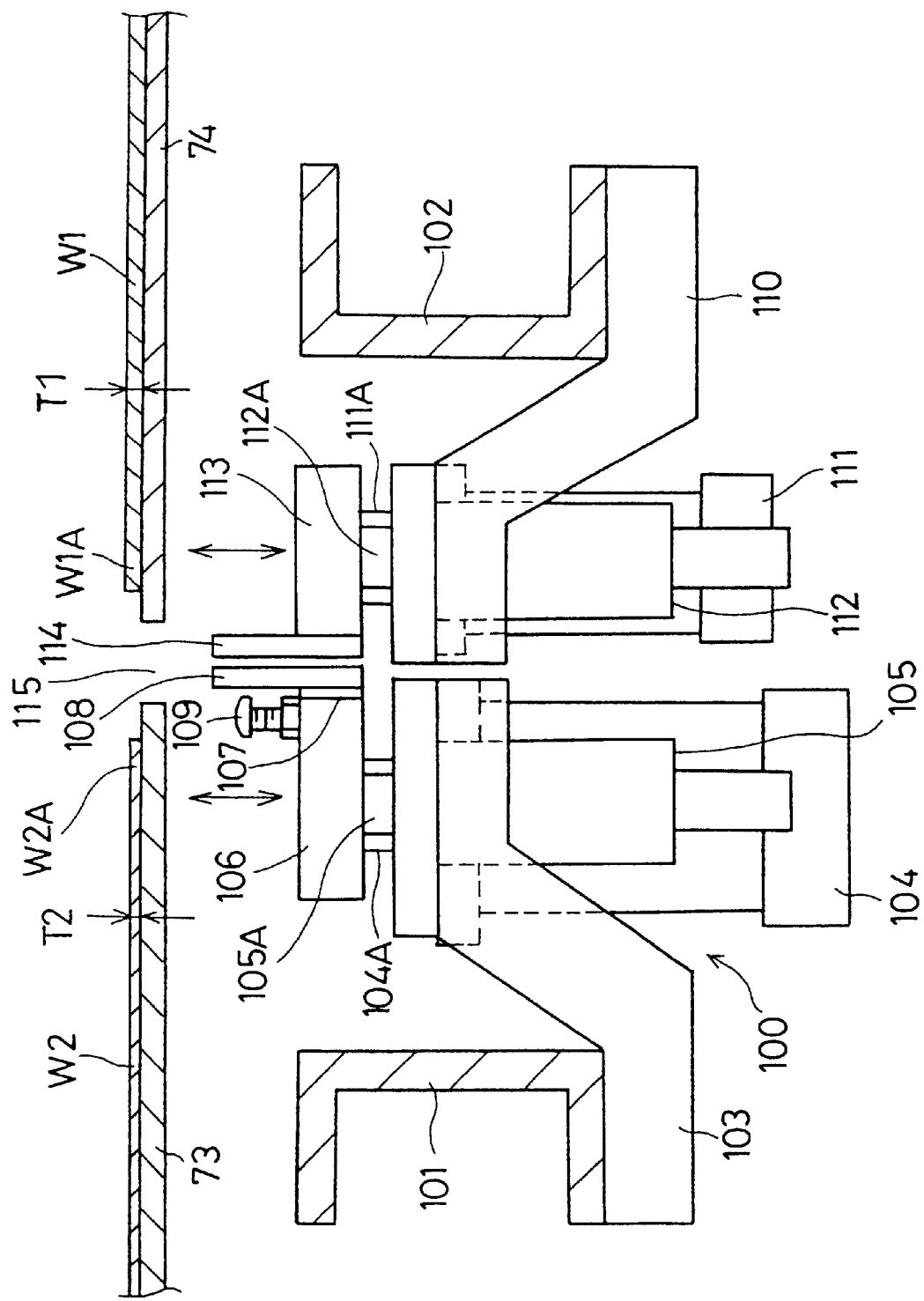
FIG. 8 is a sectional view taken along the S8—S8 line in FIG. 7, showing a lapping device shown in FIG. 7.

FIG. 8 is a sectional view taken along the S8—S8 line in FIG. 7, showing the lapping device 100. The lapping device 100 includes a first cylinder 104 which is attached upwardly to the supporting member 101 by a bracket 103, a raising and lowering member 106 which is connected to an end of a piston rod 104A of the first cylinder 104 and moves up and down by extension/retraction of the piston rod 104A while being guided by a guide member 105 into which a guide bar 105A is inserted, a stopping member 108 which is connected by a bolt to an end of the raising and lowering member 106 through a shim 107, a push-up member 109 which is provided on the raising and lowering member 106 on the backward side of the stopping member 108, a second cylinder 111 which is attached upwardly to the supporting member 102 by a bracket 110, a raising and lowering member 113 which is connected to an end of a piston rod 111A of the second cylinder 111 and moves up and down by extension/retraction of the piston rod 111A while being guided by a guide member 112 into which a guide bar 112A is inserted, and a stopping member 114 which is connected to an end of the raising and lowering member 113 by a bolt. The stopping members 108, 114 which oppose to each other are disposed right under a gap 115 between the jig members 73, 74.

Incidentally, as shown in FIG. 8, the blank W1 put on the jig member 74 is a thick plate whose thickness T1 is large, and the blank W2 put on the jig member 73 is a thin plate whose thickness T2 is small, out of the two blanks W1, W2.

Figure 9:
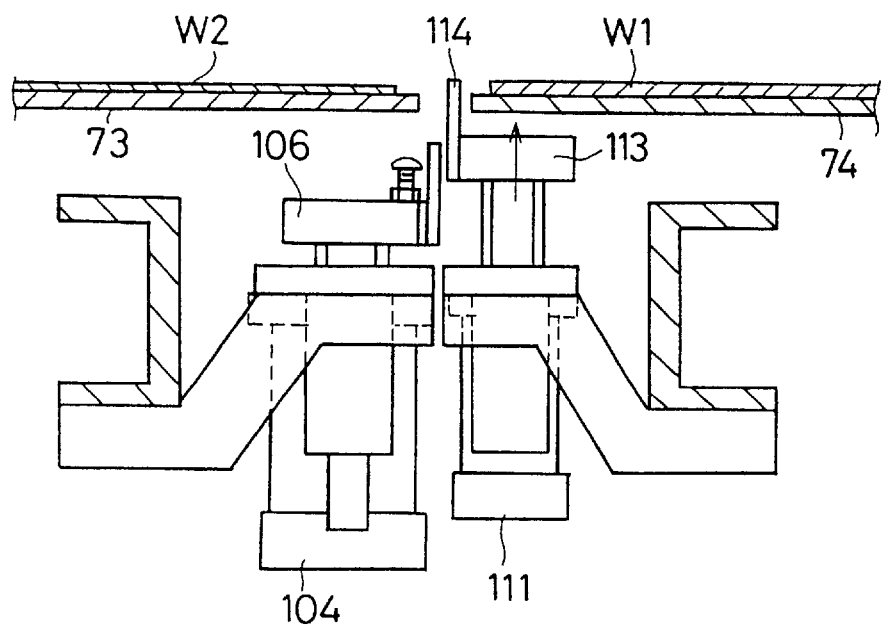
FIG. 9 is a view of a first step of operational sequences of overlapping respective end portions of two blanks by the lapping device.
Figure 10:
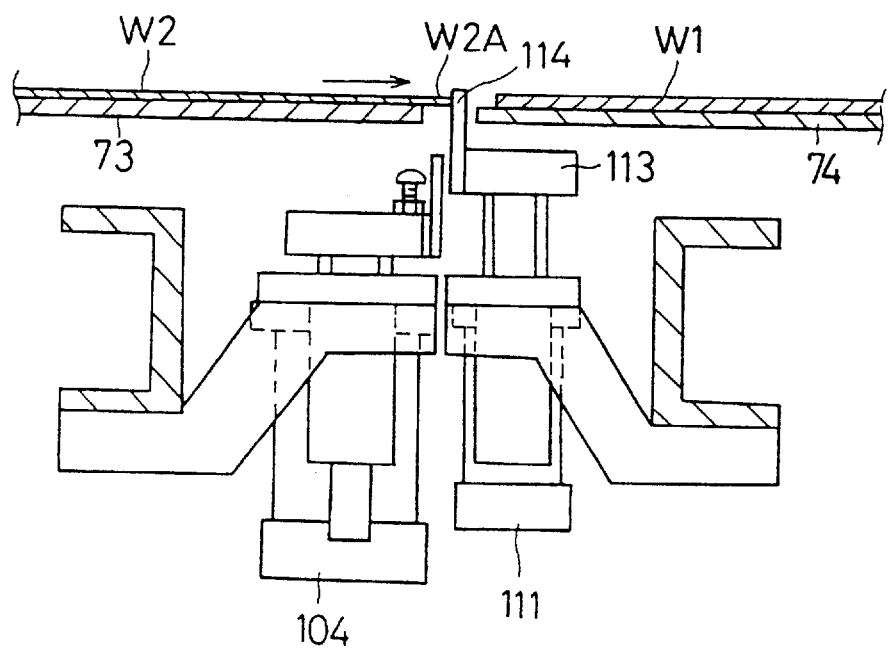
FIG. 10 is a view of a second step, following the step shown in FIG. 9.
Figure 11:
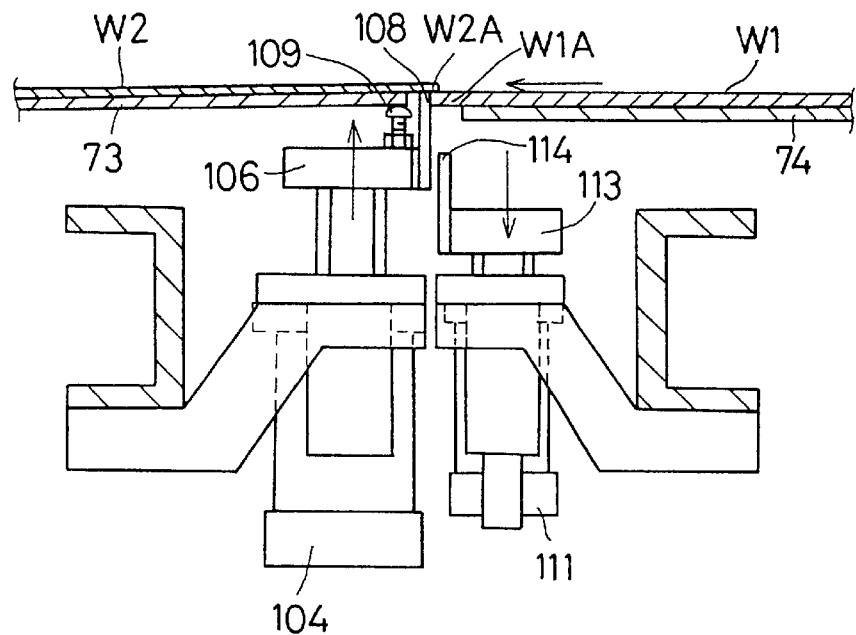
FIG. 11 is a view of a third step, following the step shown in FIG. 10.

FIG. 9 to FIG. 12 show the operational sequences of overlapping an end portion W1A of the blank W1 and an end portion W2A of the blank W2 by the lapping device 100 in due order. After the blanks W1, W2 are put on the upper surfaces of the jig members 73, 74 while being spaced out, and before the blanks W1, W2 are temporarily clamped by the temporary clamping device 80, the piston rod 111A of the second cylinder 111 first extends to raise the raising and lowering member 113 as shown in FIG. 9, whereby the stopping member 114 protrudes from the gap 115 to be higher than the jig members 73, 74 and the blanks W1, W2. Next, as shown in FIG. 10, the blank W2 is pushed toward the blank W1 side by the pushing device 90 so that its end portion W2A bumps against the stopping member 114. Then, as shown in FIG. 11, by the extension of the piston rod 104A of the first cylinder 104, the raising and lowering member 106 rises and the end portion of the jig member 73 is pushed up by the push-up member 109, whereby the jig member 73 slightly pivots upwardly on the hinges 76 as shown in FIG. 7 and the stopping member 108 pushes up the end portion W2A of the blank W2. Further, by the contraction of the piston rod 111A of the second cylinder 111, the raising and lowering member 113 and the stopping member 114 descend, and the blank W1 is pushed toward the blank W2 side by the pushing device 90 so that its end portion W1A bumps against the stopping member 108.

Figure 12:
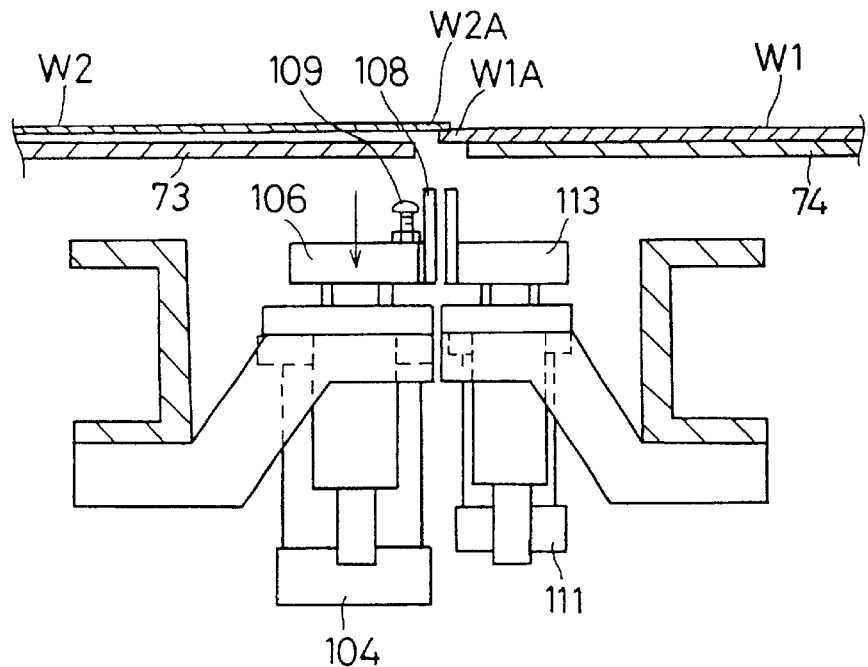
FIG. 12 is a view of a fourth step, following the step shown in FIG. 11.

Thereafter, as shown in FIG. 12, by the contraction of the piston rod 104A of the first cylinder 104, the raising and lowering member 106, the stopping member 108 and the push-up member 109 descend, and as this result, the jig member 73 returns to its original horizontal position and the end portion W2A of the blank W2 lies on the end portion W1A of the blank W1, whereby the end portions W1A, W2A overlap one another. Then, the blanks W1, W2 are temporarily clamped by the temporary clamping device 80 while maintaining the positional relations thereof.

It should be noted that a lapping amount (overlapping width) between the respective end portions W1A, W2A of the blanks W1, W2 are decided by a space between the stopping members 108 and 114. Therefore, as shown in FIG. 8, by preparing the plurality of the shims 107 with varying thicknesses to be disposed between the raising and lowering member 106 and the stopping member 108 and by exchanging these shims, the lapping amount of the respective end portions W1A, W2A can be optionally set to the appropriate size for the seam welding, according to the thickness of the blanks W1, W2 or the like.

As shown in FIG. 7, an electrode roller lying-on member 120 is disposed on the upper surface of the jig member 74 which is not movable, out of the jig members 73, 74. The electrode roller lying-on member 120 is for making an upper electrode roller lie onto a position whose height is the same or almost same with the total thickness of the end portions W1A and W2A from the upper surface of the jig member 74 before upper/lower electrode rollers of the seam welding machine 130 seam-weld the end portions W1A, W2A of the blanks W1, W2 which are overlapped by the lapping devices 100. The electrode roller lying-on member 120 is formed of a material with superior electrical conductivity so that the seam welding is not operated due to heat generation even when an electric current is passed between the upper and the lower electrodes.

FIG. 15 is an enlarged view of the electrode roller lying-on member 120 in FIG. 7 at the position where it is disposed, and FIG. 16 is a sectional view taken along the S16—S16 line in FIG. 15. A positioning member 121 in a plane L shape is fixed to an end portion of the jig member 74 which faces the gap 115 between the jig members 73, 74, and the electrode roller lying-on member 120 is attached to the upper surface of the jig member 74 by bolts 122 in a positioning state being pushed against the positioning member 121, and more than half of the electrode roller lying-on member 120 projects into the gap 115. When the electrode roller lying-on member 120 is worn out, it can be freely exchanged with a new electrode roller lying-on member 120 by removing the bolts 122.

The temporary clamping devices 80, the pushing devices 90, the lapping devices 100, the electrode roller lying-on members 120 as described above are disposed on the transfer tables 70 as shown in FIG. 7, and each of the two transfer tables 70 can freely reciprocate horizontally between the welding area A and the standby area B by a moving device 125 which is comprised of the guide rails 71 and the cylinders 72.

FIG. 17 is a side view of the seam welding machine 130, and FIG. 18 is a front view of the seam welding machine 130. A frame structure 134 having high strength is installed in the welding area A, which comprises a base table 131, columns 132 which are provided to stand at four corners of the base table 131, and two right/left horizontal beams 133 which are provided suspendedly between upper ends of the two forward/backward columns 132, respectively. Guide rails 135 which guide the travel of the seam welding machine 130 are disposed on the base table 131, and a nut member 137 is attached to a traveling table 136 which is a base part of the seam welding machine 130. Since a feed screw shaft 139 which is rotated by a servomotor 138 installed at an end of the base table 131 is screwed through the nut member 137, the seam welding machine 130 moves forward/backward to/from the welding area A by normal rotation/reverse rotation of the servomotor 138, while being guided by the guide rails 135.

The seam welding machine 130 includes a shaft receiving device 141 on a lower side which is guided up and down by a guide member 140 provided on the traveling table 136, a lower electrode roller 142 which is supported by the shaft receiving device 141, and a raising and lowering device 143 which raises/lowers the shaft receiving device 141 and the electrode roller 142. Above the traveling table 136, an arm member 144 which extends forwardly with its base end part connected to a column 136A provided at a rear end of the traveling table 136 is provided, and a cylinder 146 facing downward is connected to an end of the arm member 144 through a bracket 145. An upper shaft receiving device 147 is attached to a piston rod 146A of the cylinder 146 as shown in FIG. 18, and an upper electrode roller 148 which opposes vertically to the lower electrode roller 142 is supported by the shaft receiving device 147. By extension/retraction of the piston rod 146A of the cylinder 146, the shaft receiving device 147 and the electrode roller 148 move upward/downward while being guided by a guide member 145A which is provided to the bracket 145.

When the piston rod 146A of the cylinder 146 extends, the upper electrode roller 148 is pressed downwardly to pressurize the overlapped end portions W1A, W2A of the blanks W1, W2 by the upper/lower electrode rollers 142, 148, and hence the cylinder 146 becomes pressing means for pressing the upper electrode roller 148 downwardly in the seam welding.

Further, as shown in FIG. 17, a power source device 150 which supplies power for the seam welding to the upper/lower electrode rollers 142, 148 by a flexible member 149 having an electric cable is mounted on the traveling table 136.

As shown in FIG. 18, guide rails 151 which extend parallel to the guide rails 135 on the base table 131 are attached to the respective horizontal beams 133 of the frame structure 134, and guide members 152 which are provided to the aforesaid bracket 145 of the seam welding machine 150 are engaged with the guide rails 151 to slide freely. Therefore, the seam welding machine 130 travels by being guided by the upper/lower guide rails 135, 151, and the guide rails 151 support the weights of the cylinder 146, the upper shaft receiving device 147, and the upper electrode roller 148.

The guide rails 71 for guiding the transfer tables 70 as in FIG. 7 are supported by columns 160 which are provided to stand at the standby areas B at both sides of the welding area A, as shown in FIG. 17. Thereby, these guide rails 71 are disposed at a position higher than that of a floor 161 on which the base table 131 of the frame structure 134 is installed. Further, receiving tables 162 which are attached to the base table 131 are disposed inside the frame structure 134, and as shown in FIG. 18, receiving plates 163 are attached to respective upper surfaces of the two right/left receiving tables 162.

To the respective right/left horizontal beams 133 which comprise the frame structure 134, a plurality of brackets 170 are fixed suspendedly with predetermined spaces therebetween in a longitudinal direction of the horizontal beam 133, and cylinders 171 for a permanent clamping device are coupled downwardly to the brackets 170 by pins 172. Rear ends of upper arm members 173 are connected to piston rods 171A of the cylinders 171 by pins 174, and middle parts in a longitudinal direction of the upper arm members 173 which extend toward the welding area A side are supported by the brackets 170 to freely swing vertically around shafts 175. Lower arm members 176 are fixed to the respective receiving plate 163 at positions vertically opposing to the upper arm members 173.

When the transfer table 70 travels along the guide rails 71 to reach the welding area A and stop therein, the piston rods 171A of the cylinders 171 contracts to lower tips of the upper arm members 173 around the shafts 175, so that the blanks W1, W2 which are put on the jig members 73, 74 on the transfer table 70 are clamped with the jig members 73, 74 by the upper arm members 173 and the lower arm members 176.

Therefore, permanent clamping devices 180 for permanently clamping the blanks W1, W2 on the transfer table 70 are structured by the cylinders 171, the upper arm members 173 and the lower arm members 176. A plurality of the permanent clamping devices 180 are disposed at the both right and left sides of the seam welding machine 130 in the traveling direction of the seam welding machine 130.

Further, as shown in FIG. 17 and FIG. 18, cylinders 181 are obliquely attached to the frame structure 134 by brackets 182, and lapping amount detecting cameras 183 are attached to tips of piston rods of the cylinders 181 which extend/retract. These cylinders 181 and the cameras 183 are, as shown in FIG. 17, provided at two spots of forward/backward sides in the traveling direction of the seam welding machine 130 in the welding area A.

Figure 19:
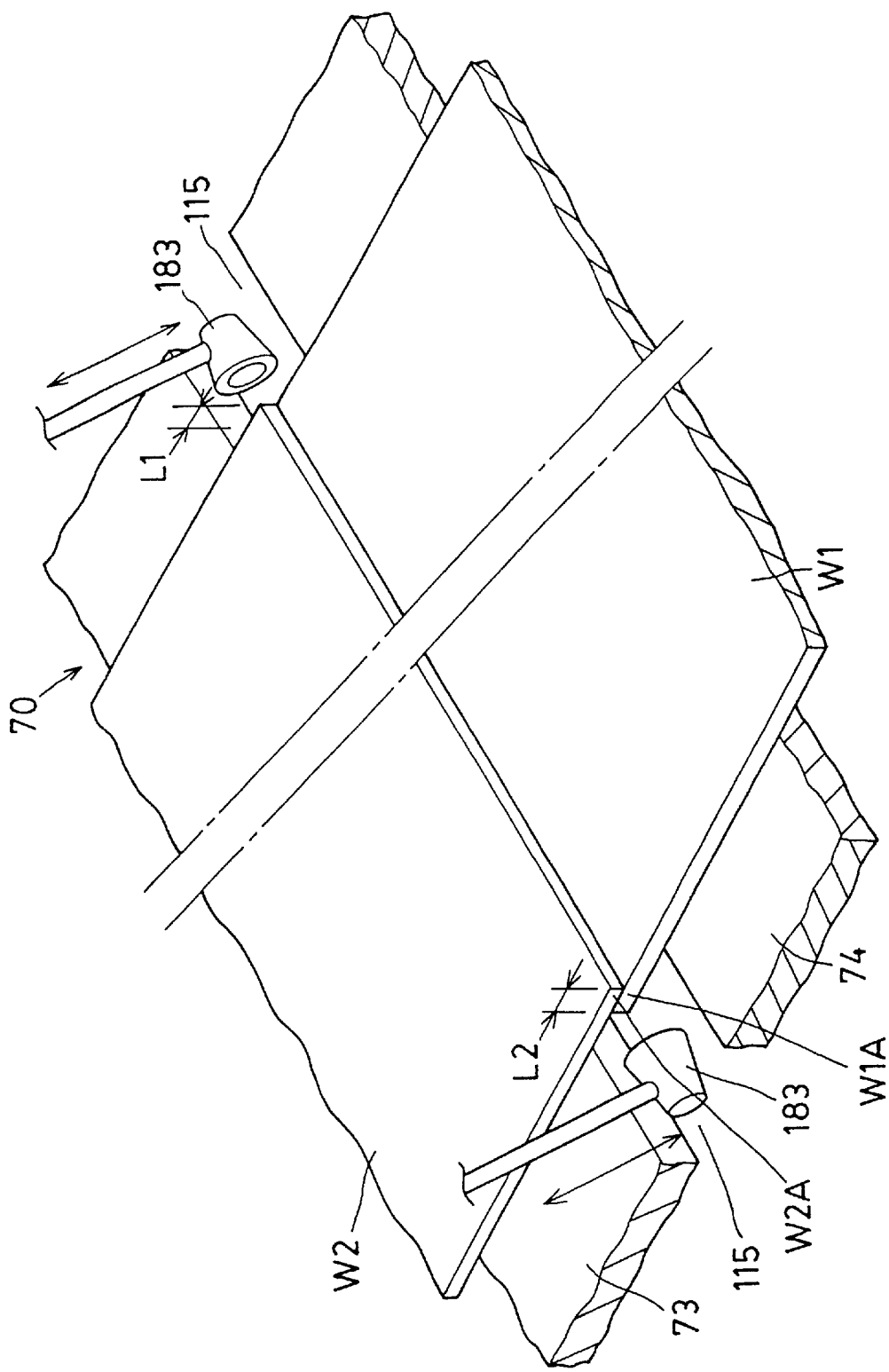
FIG. 19 is a perspective view showing a situation when overlapping amount detecting cameras detect lapping amounts of two blanks with these end portions overlapping one another.

FIG. 19 shows the operations of the two cameras 183 when the transfer table 70 reaches the welding area A from the standby area B. When the transfer table 70 moves to the welding area A to stop therein, the piston rods of the respective cylinders 181 extend so that the two cameras 183 enter the gap 115 between the jig members 73, 74 from a slanting direction, which is off the blanks W1, W2 on the transfer table 70. As this result, the two cameras 183 photograph the lapping condition at both edges of the linearly-extending end portions W1A, W2A of the blanks W1, W2 on the forward/backward sides in the traveling direction of the seam welding machine 130. This image data undergoes an arithmetic operation by a not shown processor and lapping amounts L1, L2 are calculated, and thus-calculated data is sent to a controller to be utilized to control the operation of the seam welding apparatus as a whole.

Thus, the cameras 183 become detecting means for detecting the lapping amounts L1, L2 of the end portions W1A, W2A of the blanks W1, W2 in the seam welding apparatus, and the detecting means are non-contacting type which do not contact the blanks W1, W2.

Further, as shown in FIG. 17 and FIG. 18, protrusion forming means 190 for forming protrusions in the aforesaid thin plate blank W2 out of the two blanks W1, W2 put on the transfer table 70 which reaches the welding area A and stops therein are provided to the frame structure 134 in the welding area A. The protrusion forming means 90 have upper molds 192 which are attached to piston rods of cylinders 191 facing downward. There are a plurality of the cylinders 191 in the longitudinal direction of the horizontal beams 133 of the frame structure 134, each of which is provided suspendedly between supporting portions 170A which support the aforesaid upper arm members 173 of the plurality of the brackets 170 which are provided in the longitudinal direction of the horizontal beams 133. In FIG. 23, the upper mold 192 is forming a protrusion W2B in the blank W2. A lower mold 193 which corresponds to the upper mold 192 is provided to the jig member 73 on the transfer table 70, onto which the blank W2 is put, and when the transfer table 70 reaches the welding area A to stop therein, the lower mold 193 reaches a position right under the upper mold 192, and the lower mold 193 reaches a position right above a back-up member 194 which is attached to an upper surface of the receiving plate 163 as shown in FIG. 17 and FIG. 18.

When the piston rod of the cylinder 191 extends, as shown in FIG. 23, the protrusion W2B is formed in the blank W2 by the upper mold 192 and the lower mold 193 which is received by the back-up member 194. Therefore, the protrusion forming means 190 is formed by the cylinder 191, the upper mold 192, the lower mold 193 and the back-up member 194.

As shown in FIG. 2 and FIG. 7, the two transfer tables 70 enter the welding area A from the standby areas B at both right and left sides of the welding area A by turns, and the two blanks W1, W2 are put on the transfer tables 70 at the positional relations symmetrical to each other, and therefore, the protrusion forming means 190 for forming the protrusions in the thin plate blanks W2 are provided at both right and left sides of the frame structure 134, as shown in FIG. 18.

Next, the seam welding operation of the blanks W1, W2 by the above-described seam welding apparatus will be explained. It should be noted that respective driving sources of the seam welding apparatus, such as the servomotors 14 for the driving devices 13 of the blank supply carriage 10 and the carriage 20 for removing the finished product as shown in FIG. 6, the cylinder 39 for moving the carrier 30 as shown in FIG. 3, the cylinders 72 for moving the transfer tables 70 as shown in FIG. 7, the cylinders 104, 111 of the lapping devices 100 as shown in FIG. 8, and the servomotor 138 for making the seam welding machine 130 travel as shown in FIG. 17 are operated based on computer programs, whereby moving bodies which are provided to the seam welding apparatus such as the carriages 10, 20, the carrier 30, the transfer tables 70 and the like are allowed to be operated at predetermined timings.

Further, since the operations of the moving bodies in the areas B to H which are provided at both right and left sides of the welding area A are the same therebetween, the explanation is first made about the areas B to H on one side, hereinafter.

When the blank supply carriage 10 in FIG. 3 which has stopped in the area E or the area F moves forward to the area C, the large frame 50 of the carrier 30 as shown in FIG. 5 which has moved to the area C side descends. Thereby, the suction instruments 52 of the large frame 50 attach by suction to the blanks W1, W2 which are put on the carriage 10, and the blanks W1, W2 also rise as the large frame 50 rises. Thereafter, the carrier 30 moves toward the area D side, and when the blanks W1, W2 which are attached by suction to the suction instruments 52 reach the standby area B, the large frame 50 descends. Thereby, the blanks W1, W2 are put onto the jig members 73, 74 on the transfer table 70 in FIG. 7 which has moved backward to the standby area B, and then, the attachment by suction of the suction instruments 52 is released. Subsequently, the large frame 50 rises and the carrier 30 moves backward to the area C side.

When the blanks W1, W2 are put on the jig members 73, 74 on the transfer table 70, the lapping devices 100 and the pushing devices 90 which are provided to the transfer table 70 operate. Thereby, the respective end portions W1A, W2A of the blanks W1, W2 are overlapped by undergoing the process of FIG. 9, FIG. 10, FIG. 11 and FIG. 12. Thereafter, the temporary clamping devices 80 which are disposed on the transfer table 70 are operated so that the blanks W1, W2 are temporarily clamped to the transfer table 70 while maintaining the positional relations with the respective end portions W1A, W2A overlapping one another.

Then, the transfer table 70 moves toward the welding area A side and stops in the welding area A. Thereby, the blanks W1, W2 are sent to the welding area A. Subsequently, the permanent clamping devices 180 as shown in FIG. 17, FIG. 18 which are attached to the frame structure 134 in the welding area A operate to permanently clamp the blanks W1, W2 to the transfer table 70. Thereafter, the temporary clamp of the temporary clamping devices 80 is released.

The permanent clamp of the blanks W1, W2 by the permanent clamping devices 180 means that the piston rods 171A of the cylinders 171 as shown in FIG. 18 contract to make the tips of the upper arm members 173 descend around the shafts 175. On this occasion, reactive force of the clamp occurs to the cylinders 171, which is supported by the frame structure 134 having high strength.

Thereafter, the piston rods of the cylinders 181 as shown in FIG. 17 and FIG. 18 extend to make the respective lapping amount detecting cameras 183 enter the gap 115 between the jig members 73, 74 of the transfer table 10 from the slanting direction as shown in FIG. 19, and the cameras 183 detect the lapping amounts L1, L2 of the end portions W1A, W2A of the blanks W1, W2, and then, move backward by the contraction of the piston rods of the cylinders 181. When the detected lapping amounts L1, L2 by the cameras 183 are the values within the allowance which are set beforehand, the seam welding apparatus continues its automatic operation, but when the lapping amounts L1, L2 include a value exceeding the allowance, release of the permanent clamping devices 180, re-clamp of the temporary clamping devices 80 and returning of the transfer table 70 from the welding area A to the standby area B are operated based on a signal from the controller which receives data of the lapping amount according to the image data from the cameras 183. In the standby area B, an operator releases the temporary clamping device 80 by a manual operation to change the lapping amount of the end portions W1A, W2A of the blanks W1, W2 to a proper value, and after this operation, the blanks W1, W2 are temporarily clamped by the temporary clamping devices 80.

Next, the operator inputs a start signal into the controller, so that the transfer table 70 moves from the standby area B to the welding area A, and the permanent clamp of the blanks W1, W2 by the permanent clamping devices 180, the release of the temporary clamp by the temporary clamping devices 80, and re-detecting of the lapping amounts L1, L2 by the lapping amount detecting cameras 183 are operated.

When thus-detected lapping amounts are within the allowance, the seam welding apparatus starts the automatic operation again, and when the first detected lapping amounts are within the allowance, the seam welding apparatus continues the automatic operation, whereby the seam welding machine 130 which has returned to its backward limit starts traveling toward the welding area A side. As the seam welding machine 130 travels toward the welding area A side, the upper/lower electrode rollers 142, 148 of the seam welding machine 130, with a vertical space therebetween due to the operations of the raising and lowering device 143 and the cylinder 146 in FIG. 7, pass the outer frame 70A of the transfer table 70, and thereafter, the electrode rollers 142, 148 abut against upper/lower surfaces of the electrode roller lying-on member 120 which projects from the jig member 74 to the gap 115 between the jig members 73, 74, as shown in FIG. 16, by the operations of the raising and lowering device 143 and the cylinder 146. When the upper electrode roller 148 lies on the lying-on member 120, the electrode roller 148 is pressed onto the lying-on member 120 by the cylinder 146 with high strength, and the passing of the electric current is started between the upper/lower electrode rollers 142, 148 for the mash-seam welding.

Figure 20:
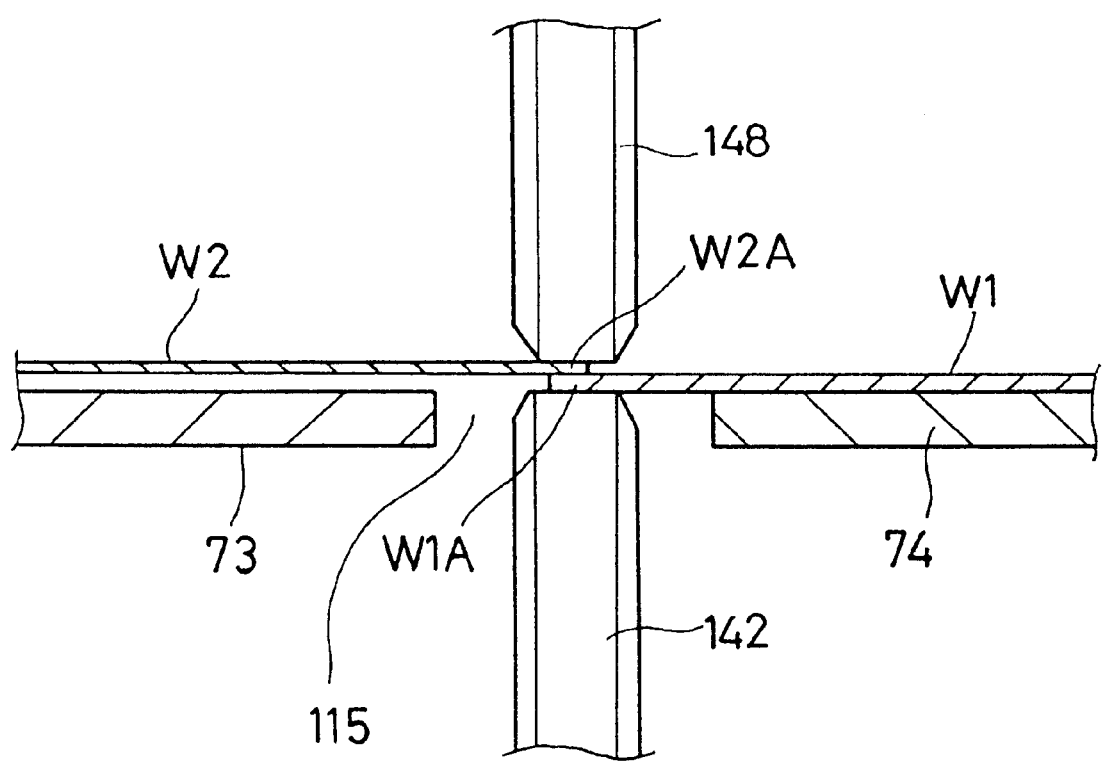
FIG. 20 is a front sectional view showing a situation when the overlapped end portions of the blanks are seam-welded by upper/lower electrode rollers of the seam welding machine.
Figure 21:
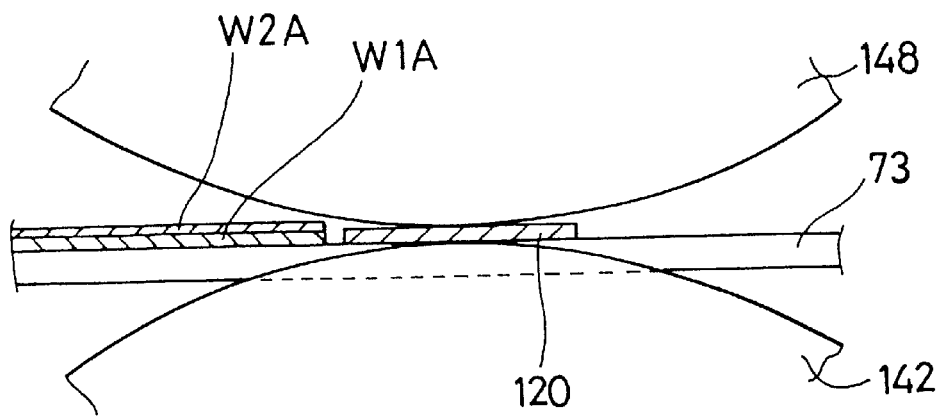
FIG. 21 is a side sectional view showing a situation when the upper/lower electrode rollers of the seam welding machine abut against an electrode roller lying-on member.

The seam welding machine 30 travels into the welding area A as it is, whereby the upper/lower electrode rollers 142, 148 move from the electrode roller lying-on member 120 onto the overlapped end portions W1A, W2A of the blanks W1, W2 as shown in FIG. 20, and start the mash-seam welding by pressurizing the end portions W1A, W2A at high pressure by the cylinder 146. The mash-seam welding does not start by the upper electrode roller 148 lying directly onto the overlapped end portions W1A, W2A. As shown in FIG. 21, the electrode roller 148 temporarily lies onto the electrode roller lying-on member 120 which has the thickness equal or almost equal to the total thickness of the end portions W1A, W2A, and thereafter, the upper/lower electrode rollers 142, 148 move onto the end portions W1A, W2A to start the pressurization onto the end portions W1A, W2A, thereby preventing edge parts of the end portions W1A, W2A on the electrode roller lying-on member 120 side (start parts of the welding of the end portions W1A, W2A) from being mashed and deformed.

Incidentally, this kind of electrode roller lying-on member may be provided to a position next to an end part of the welding of the end portions W1A, W2A in the moving direction of the seam welding machine 130 so that the electrode roller 148 of the seam welding machine 130 lies onto the electrode roller lying-on member after welding the whole length of the end portions W1A, W2A, thereby preventing the end parts of the welding of the end portions W1A, W2A from being mashed and deformed.

As described above, the seam welding of the respective overlapped end portions W1A, W2A of the blanks W1, W2 is operated by pressing the upper electrode roller 148 downwardly by the cylinder 146, and in the pressing, the upward reactive force as a counter reaction of the pressing occurs to the cylinder 146. This upward reactive force acts on the guide rails 151 through the brackets 145 and the guide members 152 as shown in FIG. 18, and is received by the frame structure 134 having high strength, to which the guide rails 151 are attached.

The seam welding machine 130 travels continuously in the welding area A so that the whole length of the end portions W1A, W2A are subjected to the mash-seam welding, thereby finishing the finished product Y by joining the blanks W1, W2. When the electrode rollers 142, 148 reach the end parts of the end portions W1A, W2A, the electrode rollers 142, 148 separate vertically to part from the end portions W1A, W2A by the operations of the raising and lowering device 143 and the cylinder 146, the passing of the electric current between the electrode rollers 142, 148 stops, and the seam welding machine 130 returns back to its original position.

When the seam welding machine 130 is moving to return to its backward position as described above, the piston rod of the cylinder 191 of the protrusion forming means 190 expands, which is provided at the position corresponding to the thin plate blank W2, out of the protrusion forming means 190 provided at both right and left sides of the frame structure 134 as in FIG. 18. Thereby, as shown in FIG. 23, the protrusion W2B which protrudes downwardly and has a hollow on the upper surface is formed in the thin plate blank W2 by the upper mold 192 and the lower mold 193, and then the piston rod of the cylinder 191 retracts to raise the upper mold 192.

Thus, the formation of the protrusion W2B in the blank W2 is operated after the blanks W1, W2 are integrally joined by the seam welding machine 130 and when the blanks W1, W2 are clamped by the permanent clamping devices 180, so that the protrusion W2B is surely formed at a predetermined position of the blank W2, and the formation of the protrusion W2B is operated by effectively utilizing the time when the seam welding machine 130 returns to the backward position.

Subsequently, the permanent clamp by the permanent clamping device 180 is released, and instead thereof, the temporary clamping devices 80 clamp the finished product Y to the jig members 73, 74 on the transfer table 70. Thus, after the finished product Y is clamped by the temporary clamping devices 80, the transfer table 70 moves from the welding area A to the original standby area B, whereby the finished product Y is returned back to the standby area B.

Incidentally, it is suitable that the temporary clamp of the blanks W1, W2 by the temporary clamping devices 80 is kept while the end portions W1A, W2A of the blanks W1, W2 are subjected to the mash-seam welding by the electrode rollers 142, 148, and that only the permanent clamp by the permanent clamping devices 180 is released after the mash-seam welding, so that the finished product Y is returned to the standby area B while being clamped to the transfer table 70 by the temporary clamping devices 80.

When the finished product Y reaches the standby area B, the large frame 50 of the carrier 30 in FIG. 5 descends so that the suction instruments 52 of the large frame 50 attach by suction to the succeeding blanks W1, W2 which are put on the carriage 10 in the area C, and the suction instruments 56 of the small frame 54 which is provided to the large frame 50 attach by suction to the finished product Y which is put on the jig members 73, 74 on the transfer table 70. When there is a significant difference between the height positions of the blanks W1, W2 on the carriage 10 and the height position of the finished product Y on the transfer table 70, the small frame 54 descends with respect to the large frame 50, thereby absorbing the difference. When the suction instruments 56 attach to the finished product Y by suction, the clamp of the temporary clamping devices 80 is released. Next, the large frame 50 rises, and the small frame 54 also rises when the small frame 54 has descended, and thereafter, the carrier 30 moves toward the area D side.

Thus, the blanks W1, W2 which are attached by suction to the suction instruments 52 is carried to the standby area B, and the finished product Y which is attached by suction to the suction instruments 56 is carried to the area D, respectively, and by the descent of the large frame 50, the blanks W1, W2 are put onto the jig members 73, 74 on the transfer table 70 and the finished product Y is put onto the carriage 20 for removing the finished product which has reached the area D, and the attachments by suction of the suction instruments 52, 56 are released.

When the carrier 30 moves toward the area D side in order to carry the finished product Y to the carriage 20 in the area D as described above, the rust-preventive oil which is blown out from the rust-preventive oil blowout nozzle 61 as shown in FIG. 3, FIG. 4 is sprayed onto the finished product Y which is attached by suction to the suction instruments 56. The sprayed portion is a portion which has been subjected to the mash-seam welding, and thus, the rust-preventive oil is coated onto the seam welded part of the finished product Y.

Further, in the transfer table 70, the blanks W1, W2 which are put on the jig members 73, 74 on the transfer table 70 are temporarily clamped by the temporary clamping devices 80, after these end portions W1A, W2A are made to overlap one another by the lapping devices 100 and the pushing devices 90, similarly to the case of the aforesaid blanks W1, W2. Then, the blanks W1, W2 are sent to the welding area A by the movement of the transfer table 70, the blanks W1, W2 are permanently clamped by the permanent clamping devices 180, and subsequently, the lapping amounts L1, L2 of the end portions W1A, W2A are detected by the cameras 183. When the lapping amounts L1, L2 are values within the allowance, the seam welding apparatus continues its automatic operation, but when a value exceeding the allowance is included, the operation of changing the lapping amount is performed by the operator as described above, and then the automatic operation starts again to operate the mash-seam welding to the end portions W1A, W2A of the blanks W1, W2 by the seam welding machine 130.

With the former finished product Y made of the blanks W1, W2, the protrusion W2B is formed in the thin plate blank W2 by the protrusion forming means 190 after the mash-seam welding, but with this finished product Y made of the blanks W1, W2, the operation of forming the protrusion W2B in the thin plate blank W2 by the protrusion forming means 190 is not operated.

The large frame 50 of the carrier 30 rises and then the carrier 30 returns back to the area C side. Thereby, it is ready to attach by suction the succeeding blanks W1, W2 which are put on the carriage 10 to the suction instruments 52 and to attach by suction the succeeding finished product Y which will be made of the blanks W1, W2 in the welding area A and returned to the standby area B by the transfer table 70 to the suction instruments 56.

Then, the above operations are repeated, whereby the finished products Y are successively manufactured in the welding area A by the blanks W1, W2 which are supplied from the carriage 10 in the area C, and the finished products Y are mounted on the carriage 20 in the area D.

The operation of forming the protrusion W2B by the protrusion forming means 190 in the thin plate blank W2 of the finished product Y which is manufactured in the welding area A by the two blanks W1, W2 is performed every time a predetermined number of the finished products Y are manufactured, for example, every time the two finished products Y are manufactured.

FIG. 24 is an enlarged view of areas of the protrusions W2B in the finished products Y which are multi-tiered on the carriage 20 in the area D. When the thicknesses T1, T2 of the two blanks W1, 2W are different as shown in FIG. 8, the end portion W2A of the thin plate blank W2 is put onto the end portion W1A of the thick plate blank W1 as shown in FIG. 12, and these end portions W1A, W2A are subjected to the mash-seam welding by the seam welding machine 130, height levels of the respective thin plate blanks W2 become equal or almost equal to height levels of the respective thick plate blanks W1 because the protrusions W2B are formed in the thin plate blanks W2. Further, since the protrusions W2B are formed in the finished products Y every time a predetermined number of the finished products Y are manufactured, and the blank W2 without the formation of the protrusion W2B exists between the blanks W2 with the formation of the protrusions W2B, the height levels of the blanks W2 are not decreased due to fits of the upper/lower protrusions W2B which protrude downwardly and have hollows on the upper surface thereof, even when the protrusions W2B are formed at the same positions in all the blanks W2 with the formation of the protrusions W2B.

When all of the blanks W1, W2 on the carriage 10 in the area C are cleared, the carriage 10 travels to the one of the areas E, F, and another carriage 10 with multiple blanks W1, W2 being put thereon is sent to the area C from the other area. Then, the new blanks W1, W2 are loaded onto the carriage 10 without the blanks W1, W2. Moreover, when the finished products Y of a predetermined number are put onto the carriage 20 in the area D, the carriage 20 travels to the one of the areas G, H, and another carriage 20 loading nothing is sent from the other area to the area D. Then, an operation of taking off all the finished products Y from the carriage 20 onto which the finished products Y of the predetermined number are put is performed.

When the uppermost finished product Y is taken off by not-shown carrying means which includes a plurality of suction instruments at positions corresponding to the blanks W1, W2, in order to take off the multiple finished products Y successively which are loaded on the carriage 20, the suction instruments can be surely attached by suction to the blanks W1, W2 because the height levels of the thick plate blank W1 and the thin plate blank W2 are equal or almost equal to each other due to the protrusions W2B.

Thus, the operations of manufacturing the finished product Y from the blanks W1, W2 are performed in the areas B to H which are provided at both right and left sides of the welding area A.

In explaining this concretely, the blanks W1, W2 are sent to the welding area A by the transfer table 70 from one standby area B out of the standby areas B at both sides of the welding area A, and the mash-seam welding operation of the blanks W1, W2 is performed in the welding area A. Meanwhile, in the other standby area B, the operations of overlapping the respective end portions W1A, W2A of the blanks W1, W2 to be succeedingly subjected to the mash-seam welding in the welding area A and temporarily clamping these blanks W1, W2 are performed on the other transfer table 70. After the mash-seam welding operation in the welding area A completes and the finished products Y manufactured thereby are returned to the original standby area B, the succeeding blanks W1, W2 are sent from the other standby area B to the welding area by the transfer table 70.

When the mash-seam welding operation of the blanks W1, W2 is performed in the welding area A, the operations of carrying the finished products Y which are sent to the original standby area B to the carriage 20 in the area D and carrying the blanks W1, W2 from the carriage 10 in the area C to the standby area B are performed by the carrier 30, and the operations of overlapping and temporarily clamping the respective end portions W1A, W2A of the blanks W1, W2 are also performed on the transfer table 70 in the standby area B.

As described thus far, in this embodiment, the blanks W1, W2 are sent from the two standby areas B which are provided at both right and left sides of the welding area A to the welding area A by turns so that the finished products Y are manufactured successively. Further, while the mash-seam welding operation of the blanks W1, W2 which are sent from the one of the two standby areas B to the welding area A is performed, the operation of overlapping the respective end portions W1A, W2A of the blanks W1, W2 to be succeedingly subjected to the mash-seam welding, which is necessary for the mash-seam welding, and the like are performed in the other standby area B.

Then, the blanks W1, W2 are sent from the two standby areas B to the welding area A by turns, and every time the finished products Y of the predetermined number set for the respective standby areas B are manufactured by the blanks W1, W2 which are sent from the respective standby areas B, the protrusion forming means 190 which are provided at both right and left sides of the frame structure 134 as shown in FIG. 18 are operated by turns.

According to the above-described embodiment, the finished products Y which are made of the blanks W1, W2 are not carried to the other area by being hung up by the suction instruments of the carrying device in the welding area A, but the blanks W1, W2 are horizontally sent from the standby areas B which are provided next to the welding area A to the welding area A, the finished products Y which are manufactured in the welding area A by the blanks W1, W2 are horizontally returned to the standby area B, and thereafter, the finished products Y are carried to the area D by the carrier 30. Therefore, the guide rails 135 for guiding the travel of the seam welding machine 130 and the frame structure 134 for providing the permanent clamping devices 180 for permanently clamping the blanks W1, W2 can be effectively arranged in the welding area A.

Further, the temporary clamping devices 80 for temporarily clamping the blanks W1, W2 to the transfer table 70 which can freely reciprocate between the welding area A and the standby area B are provided, and the finished product Y is returned while being temporarily clamped to the transfer table 70 by the temporary clamping devices 80 when the finished product Y which is manufactured in the welding area A by the blanks W1, W2 is returned to the standby area B. Hence, the finished product Y can be in the positioning state in the predetermined manner with respect to the transfer table 70, when it is returned to the standby area B. Thereby, when the suction instruments 56 of the carrier 30 attach by suction to the finished product Y for sending the finished product Y to the carriage 20, the position of the finished product Y can be the predetermined position with respect to the carrier 30, and therefore, it is possible to put the finished product Y surely onto the carriage 20.

The standby areas B are provided at both sides of the welding area A, and while the seam welding operation of the blanks W1, W2 which are sent from the one standby area B to the welding area A is performed, the overlapping operation of the respective end portions W1A, W2A of the blanks W1, W2 to be succeedingly seam-welded and the temporary clamping operation thereof are performed in the other standby area B, which makes it possible to improve operational efficiency and to increase a number of the finished products Y which can be manufactured in a predetermined time.

Furthermore, there are two transfer tables 70 which reciprocate between the welding area A and the standby areas B, which is the same number with that of the standby areas B, and since the transfer tables 70 travel along the guide rails 71 which pass through the welding area A to extend between the two standby areas B, the guide rails 71 in the welding area A are allowed to be common to these two transfer tables 70. Thereby, the structure of the moving device 125 on which the transfer tables 70 travel can be all the more simplified.

Moreover, according to this embodiment, the frame structure 134 is provided in the welding area A so that the upward reactive force is received by the frame structure 134, which occurs to the cylinder 146 as the pressing means for downwardly pressing the upper electrode roller 148 when the overlapped end portions W1A, W2A of the blanks W1, W2 are pressurized by the upper/lower electrode rollers 142, 148 of the seam welding machine 130 which moves forward to the welding area A to operate the mash-seam welding. Therefore, it is not necessary to provide a C-shaped frame which has high strength to the seam welding machine 130 for supporting the upward reactive force. Since the column 136A and the arm member 144 of the traveling table 136 which are provided in the seam welding machine 130, as shown in FIG. 17, are for moving the upper/lower electrode rollers 142, 148 simultaneously when the seam welding machine 130 moves forward/backward, the column 136 and the arm member 144 may be light in weight, without having high strength.

Therefore, it is possible to make the total weight of the seam welding machine 130 lighter, and to make the seam welding machine 130 travel lightly for the mash-seam welding of the blanks W1, W2.

Further, since the frame structure 134 is formed by including the columns 132 which are provided to stand and spaced out in the forward/backward direction of the seam welding machine 130 and the horizontal beams 133 which are provided suspendedly between the upper ends of the columns 132, the frame structure 134 can be simply structured to be easily installed in the welding area A, and the structure thereof becomes to be able to effectively support with high strength the upward reactive force, which occurs when the cylinder 146 presses the upper electrode roller 148 downwardly.

Moreover, the guide rails 151 which extend in the forward/backward direction of the seam welding machine 130 are provided to the frame structure 134 and the upward reactive force which occurs when the cylinder 146 presses the upper electrode roller 148 downwardly is made to act on the guide rails 151, so that the upward reactive force can be supported by the frame structure 134 through the guide rails 151 while the seam welding machine 130 is moved forward for mash-seam-welding the respective end portions W1A, W2A of the blanks W1, W2.

Since the columns 132 which are provided to stand and spaced out in the forward/backward direction of the seam welding machine 130 and the horizontal beams 133 which are provided suspendedly between the upper ends of the columns 132 are provided at both right and left sides of the seam welding machine 130 in the welding area A and the guide rails 151 are attached to the respective horizontal beams 133, it is possible to receive the upward reactive force by the two guide rails 151. As this result, the upward reactive force can be supported dispersively, by which it becomes possible to support the stronger upward reactive force.

Further, the frame structure 134 has the base table 131 onto which the columns 132 are provided to stand, and the guide rails 135 which guide the forward/backward movement of the seam welding machine 130 are disposed on the base table 131, and hence, the frame structure 134 can serve both as the structure necessary for moving the seam welding machine 130 forward/backward and the structure necessary for receiving the upward reactive force. Moreover, since the frame structure 134 is formed by including the base table 131, the strength of the frame structure 134 can be further increased.

According to this embodiment, the permanent clamping devices 180 for permanently clamping the blanks W1, W2 when the end portions W1A, W2A are subjected to the mash-seam welding by the seam welding machine 130 are attached to the frame structure 134 and the reactive force of the clamp when the permanent clamp is operated is made to be received by the frame structure 134, so that the strong reactive force of the permanent clamp which is necessary for the mash-seam welding of the blanks W1, W2 can be also supported by the frame structure 134.

According to this embodiment, the cameras 183 for detecting the lapping amounts of the end portions W1A, W2A of the two blanks W1, W2 which are sent by the transfer table 70 are disposed in the welding area A, which makes it possible to start the seam welding by the seam welding machine 130 after the lapping amounts are detected by the cameras 183. As this result, it is possible to obtain the finished product Y with a predetermined seam welding strength by the blanks W1, W2 with the proper lapping amounts, and when the detected lapping amounts include the value exceeding the allowance, it is possible to stop the operation of the seam welding apparatus and to perform the operation of changing it to the predetermined lapping amount. Further, the lapping amounts can be automatically detected by the cameras 183 so that a number of the operators necessary for the seam welding can be reduced.

The means for detecting the lapping amounts are the cameras 183 of the non-contacting type which do not contact the blanks W1, W2, and therefore, there does not arise the problem such as an wear-out of the detecting means.

The two cameras 183 are disposed opposingly at the both edges of the end portions W1A, W2A of the blanks W1, W2 to be seam-welded on the forward/backward sides in the traveling direction of the seam welding machine 130, and the lapping amounts L1, L2 at the both edges thereof are detected by these cameras 183. Hence, it is possible to detect whether the lapping amounts of the end portions W1A, W2A of the blanks W1, W2 across the whole length thereof, which are welded by the seam welding machine 130 and extend linearly, are within the predetermined range or not.

Since the two cameras 183 detect the lapping amounts L1, L2 in the gap 115 between the two jig members 73, 74 on which the two blanks W1, W2 are put, the lapping amounts can be detected by effectively utilizing the gap 115.

Furthermore, the cameras 183 are attached to the tips of the piston rods of the cylinders 181, movable forward/backward to/from the blanks W1, W2, and moved forward when detecting the lapping amounts, and therefore, the cameras 183 do not obstruct the movement of the transfer table 70 when the blanks W1, W2 are sent to the welding area A by the transfer table 70.

Moreover, according to this embodiment, the protrusion forming means 190 are disposed in the welding area A, and the protrusion forming means 190 form the protrusions W2B in the thin plate blanks W2 out of the two blanks W1, W2 with different thicknesses. Therefore, when the multiple finished products Y which are made of these blanks W1, W2 are loaded onto the carriage 20 which moves between the area D and the areas G, H, the height position of the thick plate blank W1 and the height position of the thin plate blank W2 in the finished products Y become equal or almost equal to each other, respectively, and the respective finished products Y are in the horizontal state or almost horizontal state as a whole. Therefore, the operations of attaching by suction the uppermost finished product Y successively and carrying the finished product Y to a predetermined position where the press work or the like is performed by the carrying means which includes the plurality of the suction instruments at the positions corresponding to the blanks W1, W2 can be operated in a predetermined manner.

Further, since the protrusion W2B is formed in the thin plate blank W2 by the protrusion forming means 190 after the seam welding machine 130 moves forward to complete the seam welding of the two blanks W1, W2, and when the seam welding machine 130 is moving back to its backward position, it is unnecessary to provide a time especially for forming the protrusion W2B in the total time of the seam welding operation. Therefore, the entire working time is not lengthened and the seam welding operation can be efficiently performed.

When the protrusion W2B is formed in the thin plate blank W2, the finished product Y which is made of the two blanks W1, W2 is permanently clamped by the permanent clamping devices 180, and hence the protrusion W2B can be formed surely at the predetermined position in the finished product Y.

The protrusions W2B are not formed in all the finished products Y which are made of the two blanks W1, W2, but the protrusions W2B are formed in the finished products Y which are manufactured every time after the predetermined number of the finished products Y are manufactured. Therefore, although the protrusions W2B have the shapes which protrude downwardly and have the hollows on the upper surfaces thereof, the finished products Y without the formation of the protrusions W2B exist between the finished products Y with the formation of the protrusions W2B when the multiple finished products Y are loaded onto the carriage 20. Thereby, it can be prevented that the upper/lower protrusions W2B fit to each other to lower the height position in the area of the thin plate blank W2 in the finished product Y.

Figure 22:
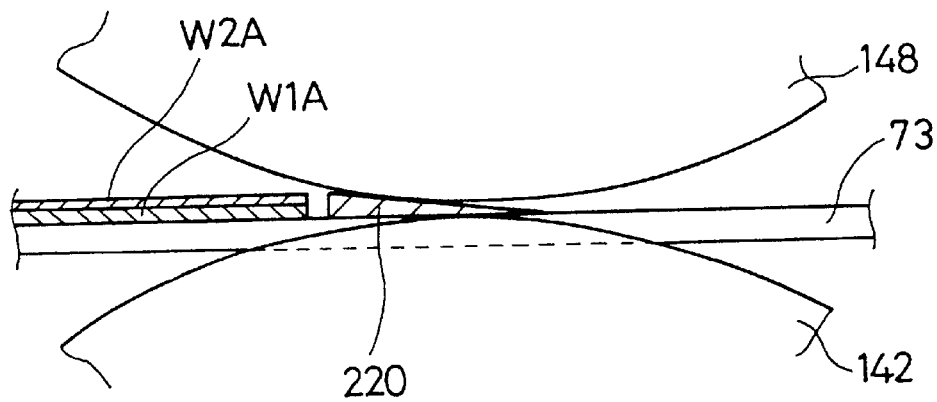
FIG. 22 is a view similar to FIG. 20, showing an embodiment in which a side section of an electrode roller lying-on member is taper-shaped.

FIG. 22 shows an electrode roller lying-on member 220 according to another embodiment. The thickness of the electrode roller lying-on member 220 is not uniform in the forward direction of the seam welding machine 130, and its side section is taper-shaped which increases its thickness toward the forward direction. By using the electrode roller lying-on member 220 like this, the upper/lower electrode rollers 142, 148 are allowed to abut against each other before these electrode rollers 142, 148 of the seam welding machine 130 reach a position of the electrode roller lying-on member 220. Further, when the electrode rollers 142, 148 reach the position of the electrode roller lying-on member 220, the electrode rollers 142, 148 can be separated vertically by the electrode roller lying-on member 220 so that they can move to the end portions W1A, W2A of the blanks W1, W2, similarly to the electrode roller lying-on member 120 in the previous embodiment.

Figure 25:
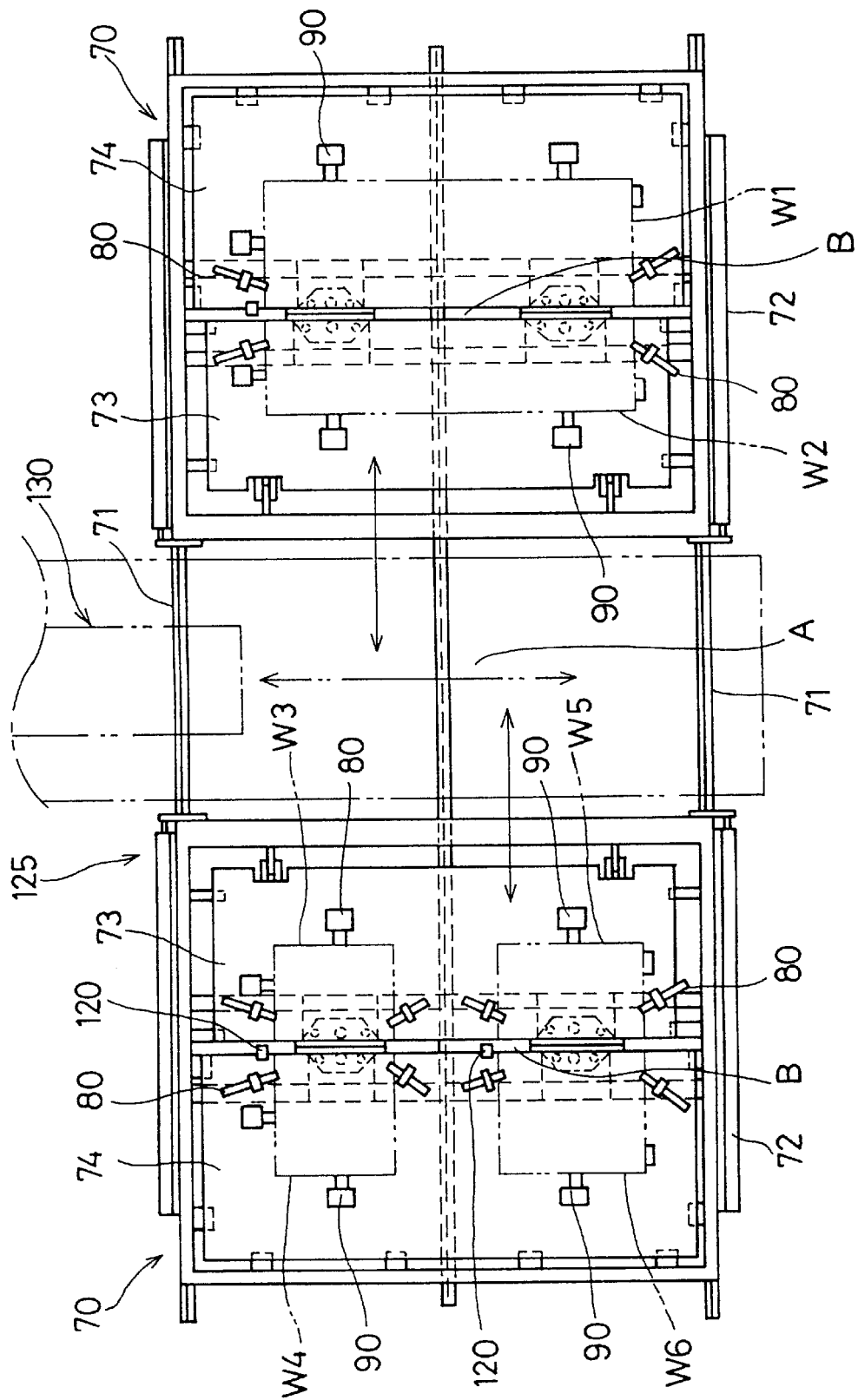
FIG. 25 is a view similar to FIG. 7, showing an embodiment in which blanks with different sizes are sent to the welding area from standby areas which are provided at both sides of a welding area.

FIG. 25 shows an embodiment in which blanks which are sent from the standby areas B provided at both right and left sides of the welding area A to the welding area A by the two transfer tables 70 have different sizes. Further, FIG. 26 shows an embodiment in which blanks which are sent from the standby areas B to the welding area A by the two transfer tables 70 have different shapes.

These embodiments can be realized by making the disposing positions of the temporary clamping devices 80 and the pushing devices 90 on the jig members 73, 74 on the transfer tables 70 change freely. In order to make the disposing positions of the temporary clamping devices 80 and the pushing devices 90 change freely, female screw holes into which the bolts 86 which fix the cylinders 81 for the temporary clamping devices 80 to the jig members 73, 74 as in FIG. 13 are screwed and female screw holes into which the bolts 94 which fix the cylinders 91 for the pushing devices 90 to the jig members 73, 74 as in FIG. 14 are screwed may be formed in the jig members 73, 74 in changing the disposing positions of the temporary clamping devices 80 and the pushing devices 90. Alternatively, a plurality of the female screw holes into which the bolts 86, 94 can be screwed may be previously formed in the jig members 73, 74.

In the embodiment shown in FIG. 25, the size of the blanks W1, W2 which are sent from one of the standby areas B to the welding area A and the size of blanks W3 to W6 which are sent from the other standby area B to the welding area A are different from each other. Thereby, the finished products with different sizes can be manufactured in the welding area A by turns.

Figure 26:
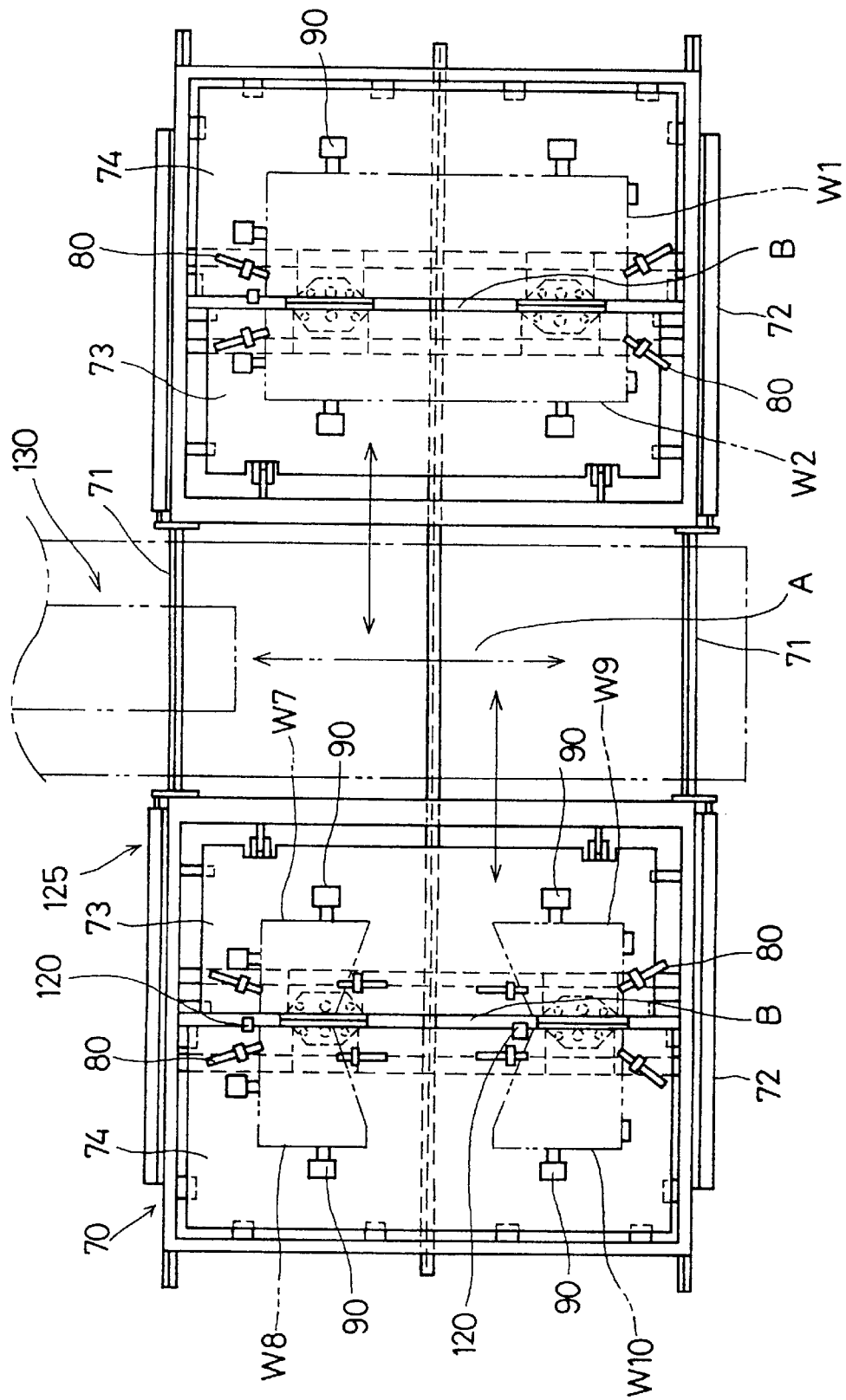
FIG. 26 is a view similar to FIG. 7, showing an embodiment in which blanks with different shapes are sent to the welding area from the standby areas which are provided at both sides of the welding area.

In the embodiment shown in FIG. 26, the shape of the blanks W1, W2 which are sent from one of the standby areas B to the welding area A and the shape of blanks W7 to W10 which are sent from the other standby area B to the welding area A are different from each other. Thereby, the finished products with different shapes can be manufactured in the welding area A by turns.

In the above embodiments, when the sizes of the blanks W3 to W6, W7 to W10 are smaller enough than that of the blanks W1, W2 and therefore a pair of the two blanks which are put on one transfer table 70 to be seam-welded by the seam welding machine 130 can be disposed in multiple pairs in the traveling direction of the seam welding machine 130, it is possible to perform the seam welding of the multiple pairs of the blanks by one travel of the seam welding machine 130. In this case, the electrode roller lying-on member 120 should be provided each for the respective pairs of the blanks. It is of course suitable to use the electrode roller lying-on member 220 in FIG. 21 instead of the electrode roller lying-on member 120. Further, when the pair of the two blanks are disposed in the multiple pairs in the traveling direction of the seam welding machine 130, it is necessary to stop the passing of the electric current to the electrode rollers 142, 148 of the seam welding machine 130 between the respective pairs of the blanks.

When the embodiments in FIG. 25 and FIG. 26 are embodied, a number of the lapping amount detecting cameras 183 which will be disposed in the welding area A corresponds to the larger number of the pairs of the two blanks between the numbers of the pairs of the blanks which are sent from the standby areas B provided at both right and left sides of the welding area A by turns to the welding area A by the two transfer tables 70. When the blanks of the larger number of the pairs are sent to the welding area A by one transfer table 70, all the cameras 183 operate, and when the blanks of the smaller number of the pairs are sent to the welding area A by the other transfer table 70, the cameras 183 of the corresponding number to the number of the pairs operate.

Figure 27:
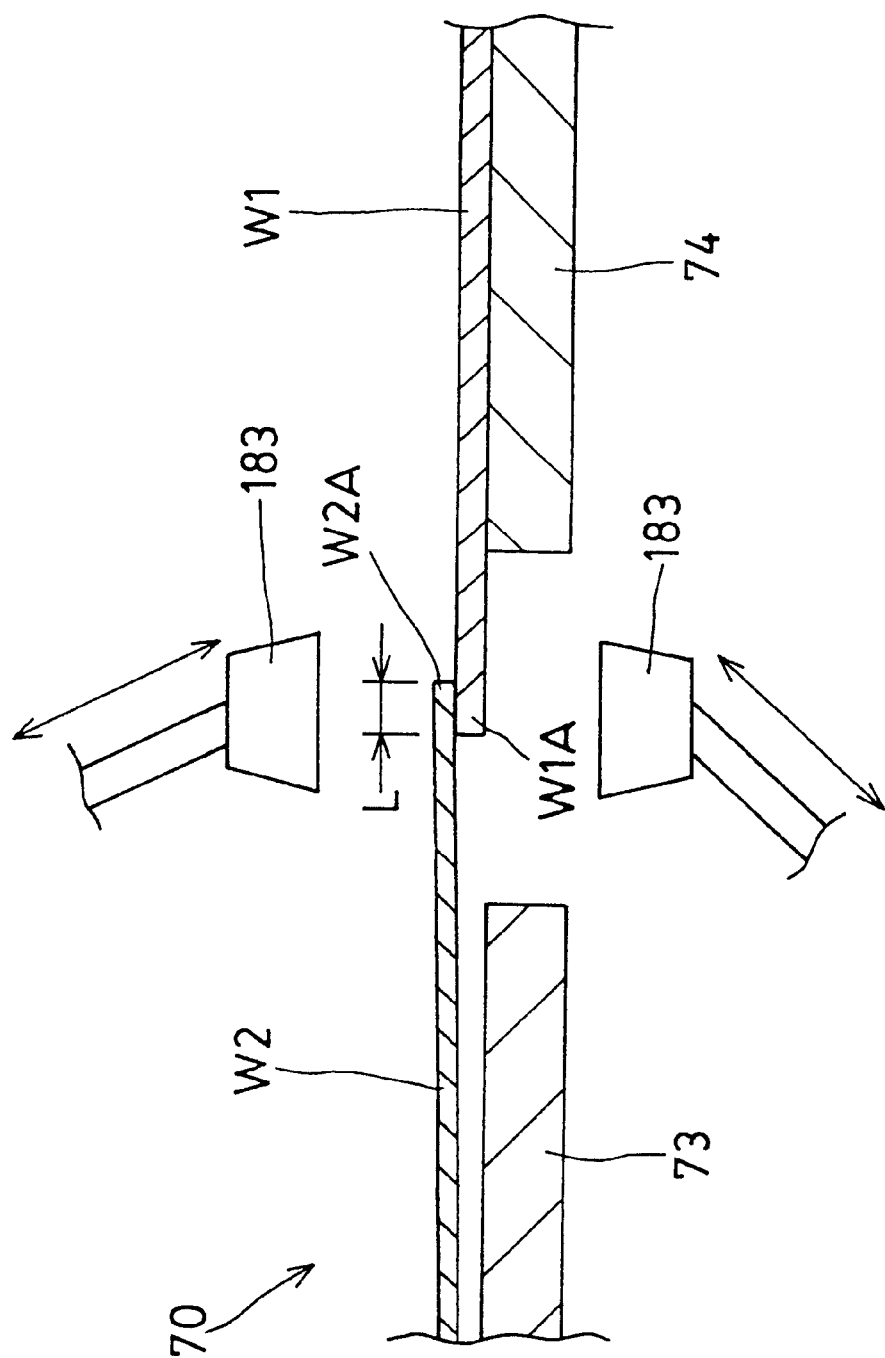
FIG. 27 is a vertical sectional view showing an embodiment in which the lapping amounts of the two blanks with these end portions overlapping one another are detected by upper/lower overlapping amount detecting cameras.

FIG. 27 shows another embodiment of detecting positions when the lapping amounts of the end portions W1A, W2A of the blanks W1, W2 are detected by the lapping amounts detecting cameras 183. In this embodiment, the cameras 183 move forward by extension of piston rods of cylinders which are attached to the frame structure 134 in the welding area A and make a pair with two of these which are disposed on upper/lower sides of the blanks W1, W2 which are sent to the welding area A, and a plurality of the pairs are provided in the traveling direction of the seam welding machine 130. The upper/lower cameras 183 of the respective pairs detect the lapping amount L of the end portions W1A, W2A of the blanks W1, W2 at positions where the cameras 183 move forward.

In the respective embodiments as described above, it is also suitable to send a predetermined number of the blanks from one of the standby areas B to the welding area A by the transfer table 70 and thereafter send a predetermined number of the blanks from the other standby area B to the welding area A by the transfer table 70, not to send the blanks from the standby areas B at both right and left sides of the welding area A by the transfer tables 70 by turns. Thereby, when the finished products with different sizes and shapes are manufactured by the blanks with different sizes and shapes as in the embodiments in FIG. 25, FIG. 26, it is possible to manufacture the finished products of the same type with the same size and shape successively, and to easily control them.

Industrial Availability

As described above, the seam welding apparatus and the seam welding method according to the present invention are effective for the seam welding of the two blanks, in order to manufacture the member which is used as the part of the car body of the automobile or the like.

What is claimed is:

1. A seam welding apparatus, comprising:
   a transfer table having a jig member for putting a plurality of blanks thereon and being movable between a standby area and a welding area;
   a moving device for allowing the transfer table to reciprocate horizontally between the standby area and the welding area;
   a temporary clamping device for temporarily clamping the plurality of the blanks in the standby area being disposed on said transfer table;
   a clamping device disposed in the welding area for clamping the plurality of the blanks with end portions overlapping one another in positional relationship for seam-welding the respective end portions of the plurality of blanks in the welding area, said clamping device disposed in the welding area being a permanent clamping device for permanent clamping the blanks being temporarily clamped; and
   a seam welding machine being movable forward/backward to/from the welding area for seam-welding the respective end portions.

2. The seam welding apparatus according to claim 1, wherein an overlapping device for overlapping the respective end portions of the plurality of the blanks is disposed to said transfer table.

3. The seam welding apparatus according to claim 2, wherein there are two jig members provided on said transfer table for putting the plurality of the blanks thereon and disposed with a gap therebetween, and a position of the gap when said transfer table reaches the welding area and stops therein corresponds to a position where said seam welding machine moves forward/backward, and
   wherein an electrode roller lying-on member with a part thereof projecting into the gap is disposed on at least one of the two jig members, and the electrode roller lying-on member onto which an upper electrode roller lies, out of two upper/lower electrode rollers of said seam welding machine for seam-welding the respective end portions of the plurality of the blanks, is disposed at a position opposing to at least one of a start part side and an end part side of welding of the plurality of the blanks.

4. The seam welding apparatus according to claim 1, wherein standby areas are disposed at two spots of both sides of the welding area,
   there are two transfer tables, and
   said moving device allows one of the transfer tables to reciprocate between one of the two standby areas and the welding area and the other transfer table to reciprocate between the other standby area and the welding area.

5. The seam welding apparatus according to claim 1, wherein an upper electrode roller out of two upper/lower electrode rollers of said seam welding machine for seam-welding the respective end portions of the plurality of the blanks is pressed downwardly by pressing means, and
   a structure is disposed in the welding area and an upward reactive force occurring when the upper electrode roller is pressed downwardly by the pressing means is received by the structure.

6. The seam welding apparatus according to claim 5,
wherein at least one guide rail extending in a forward/backward direction of said seam welding machine to guide its forward/backward movement is provided to the structure, and the upward reactive force acts on the guide rail.

7. The seam welding apparatus according to claim 5,
wherein the structure is formed by including a plurality of columns provided to stand and spaced out in a forward/backward direction of said seam welding machine and a beam provided suspendedly between upper ends of the columns.

8. The seam welding apparatus according to claim 5,
wherein a clamping device for clamping the plurality of the blanks with the end portions overlapping one another is attached to the structure.

9. The seam welding apparatus according to claim 1,
wherein detecting means is disposed for detecting overlapping amounts of the overlapped end portions of the plurality of the blanks before the seam welding is performed in the welding area.

10. The seam welding apparatus according to claim 9,
wherein the detecting means are two cameras, and the cameras detect the overlapping amounts at both edges of the end portions of the plurality of the blanks to be seam-welded on forward/backward sides in a traveling direction of said seam welding machine.

11. The seam welding apparatus according to claim 10,
wherein the two cameras detect the overlapping amounts in a gap between two jig members provided on said transfer table for putting the plurality of the blanks thereon.

12. The seam welding apparatus according to claim 9,
wherein the detecting means are a plurality of cameras, and the cameras make a pair with two of these being disposed on upper/lower sides of the plurality of the blanks.

13. The seam welding apparatus according to claim 9,
wherein the detecting means is movable forward/backward to/from the plurality of the blanks to be seam-welded.

14. The seam welding apparatus according to claim 1,
wherein the plurality of the blanks are two blanks with different thicknesses, and
a protrusion forming means for forming a protrusion in the blank with smaller thickness is disposed in the welding area.

15. The seam welding apparatus according to claim 14,
wherein the protrusion protrudes downwardly and has a hollow on an upper surface thereof, and
the protrusion forming means operates every time a predetermined number of finished products are manufactured by the two blanks being seam-welded by said seam welding machine.

16. The seam welding apparatus according to claim 1,
wherein a seam welding by said seam welding machine is a mash-seam welding.

17. A seam welding method comprising the steps of:
supplying a plurality of blanks to a standby area;
overlapping and temporarily clamping respective end portions of the blanks;
sending horizontally the blanks from the standby area to a welding area;
permanently clamping the plurality of blanks with the respective end portions overlapping one another in positional relationship for seam-welding the respective end portions;
seam-welding the respective end portions by a seam welding machine in the welding area;
releasing the clamp thereafter;
returning horizontally a finished product made of the plurality of blanks from the welding area to the standby area; and
carrying the finished product from the standby area to another area.

18. The seam welding method according to claim 17,
wherein the finished product is clamped by a temporary clamping device which has temporarily clamped the blanks when the plurality of the blanks are sent from the standby area to the welding area, in the steps of releasing the permanent clamping and returning the finished product from the welding area to the standby area.

19. The seam welding method according to claim 17,
wherein the standby areas are disposed at two spots of both sides of the welding area,
in permanently clamping and seam-welding in the welding area the plurality of the blanks temporarily clamped in the standby area, a plurality of blanks to be succeedingly subjected to the seam welding are temporarily clamped in another standby area, and the finished product made of the plurality of the blanks being seam-welded in the welding area is returned from the welding-area to the standby area after releasing the permanent clamping,
in sending the plurality of the blanks temporarily clamped in the other standby area to the welding area for the permanent clamp and seam-welding the blanks in the welding area, a plurality of blanks to be succeedingly subjected to the seam welding are temporarily clamped in the standby area, and the finished product made of the plurality of the blanks being seam-welded in the welding area is returned from the welding area to the other standby area after releasing the permanent clamping, and
the plurality of the blanks temporarily clamped in the standby area are sent to the welding area for the permanent clamping, and the above operations are repeated.

20. The seam welding method according to claim 17,
wherein the plurality of blanks are two blanks with different thicknesses, and
a protrusion forming means for forming a protrusion in the blank with smaller thickness is disposed in the welding area, and the protrusion forming means forms the protrusion in the blank with a smaller thickness out of the two blanks after being seam-welded by the seam welding machine with its forward movement, when the seam welding machine is moving to return to its backward position.

21. The seam welding method according to claim 20,
wherein the protrusion protrudes downwardly and has a hollow on an upper surface thereof,
the protrusion forming means operates every time a predetermined number of the finished products are manufactured by the two blanks being seam-welded by the seam welding machine, and
the manufactured finished products in a multiple number are multi-tiered in another area.

22. The seam welding method according to claim 17,
wherein seam welding by the seam welding machine is a mash-seam welding.

* * * * *